(12) United States Patent
Jacob et al.

(10) Patent No.: US 11,513,867 B2
(45) Date of Patent: Nov. 29, 2022

(54) SYNCHRONIZATION BETWEEN PROCESSES IN A COORDINATION NAMESPACE

(71) Applicant: International Business Machines Corporation, Armonk, NY (US)

(72) Inventors: Philip Jacob, Congers, NY (US); Philip N. Strenski, Yorktown Heights, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 17/138,540

(22) Filed: Dec. 30, 2020

(65) Prior Publication Data

US 2021/0271526 A1 Sep. 2, 2021

Related U.S. Application Data

(63) Continuation of application No. 16/409,377, filed on May 10, 2019, now Pat. No. 11,023,291.

(51) Int. Cl.
*G06F 9/46* (2006.01)
*G06F 9/52* (2006.01)
*G06F 9/54* (2006.01)
*G06F 9/50* (2006.01)

(52) U.S. Cl.
CPC ............ *G06F 9/522* (2013.01); *G06F 9/5072* (2013.01); *G06F 9/546* (2013.01)

(58) Field of Classification Search
CPC ......... G06F 9/522; G06F 9/5072; G06F 9/546
See application file for complete search history.

(56) References Cited

U.S. PATENT DOCUMENTS

| | | |
|---|---|---|
| 2015/0339173 A1 | 11/2015 | Champseix et al. |
| 2016/0170813 A1 | 6/2016 | Robison |
| 2017/0063613 A1 | 3/2017 | Bloch et al. |
| 2018/0307985 A1 | 10/2018 | Appu et al. |

OTHER PUBLICATIONS

Stoif et al., "Hardware Synchronization for Embedded Multi-Core Processors", IEEE, Jun. 2011, DOI: 10.1109/ISCAS.2011.5938126, 4 pages.
List of IBM Patents or Patent Applications Treated as Related.

*Primary Examiner* — Gregory A Kessler
(74) *Attorney, Agent, or Firm* — Scully, Scott, Murphy & Presser, PC; Daniel P. Morris, Esq.

(57) ABSTRACT

A system and method of supporting point-to-point synchronization among processes/nodes implementing different hardware barriers in a tuple space/coordinated namespace (CNS) extended memory storage architecture. The system-wide CNS provides an efficient means for storing data, communications, and coordination within applications and workflows implementing barriers in a multi-tier, multi-nodal tree hierarchy. The system provides a hardware accelerated mechanism to support barriers between the participating processes. Also architected is a tree structure for a barrier processing method where processes are mapped to nodes of a tree, e.g., a tree of degree k, to provide an efficient way of scaling the number of processes in a tuple space/coordination namespace.

20 Claims, 17 Drawing Sheets

SYNCHRONIZATION BETWEEN PROCESSES IN A COORDINATION NAMESPACE

STATEMENT REGARDING FEDERALLY SPONSORED RESEARCH OF DEVELOPMENT

This invention was made with U.S. Government support under Contract. No. B621073 awarded by the Department of Energy. The government has certain rights to this invention.

FIELD

The present invention generally relates to memory architectures and memory management for handling multiple processes that require coordination across multiple nodes in computer systems.

BACKGROUND

Multiple processes in multiple node computing systems that require coordination need points of synchronization or barriers. This becomes harder across multiple nodes. Previous attempts to do this has been with software approach using "mpich" libraries where MPICH is a high performance and widely portable implementation of the message passing interface (MPI) standard for supporting different computation and communication platforms including commodity clusters, high-speed networks and proprietary high-end computing systems. Using the MPICH approach, all processes within a communicator world issue MPI_Barrier for synchronization. Further, most algorithms run by multi-node processing systems depend on point-to-point messages. Nodal architectures of processing point-to-point messaging include K-ary tree, binomial, centralized, tournament, butterfly.

Serialization is an issue when a large number of processes have to participate in a barrier. Current approaches implement software algorithms like trees to spread out the accumulation across multiple nodes. The involvement of additional software increases latency.

SUMMARY

A hardware accelerated system and method to support barriers between participating processes in a coordination namespace extended memory architecture.

A system and method that architects a tree structure to provide an efficient way of scaling the number of processes in a tuple space/coordination namespace extended memory architecture supporting a hardware barrier implementation.

In one aspect, there is provided a method for implementing a barrier network for a plurality of processes running at one or more distributed computing nodes sharing a coordination namespace. The method comprises: receiving, at a controller associated with a node, a setup barrier message having parameters indicating a barrier name and a value representing a number of barrier tuples associated with the processes participating in the barrier; allocating, in response to receiving the setup barrier message for the barrier name, at least one named data element in the coordination namespace at the node; subsequently receiving, at the controller, a barrier tuple from each process participating in the barrier indicating when the participating process has reached the barrier; and responsive to receiving barrier tuples from all processes participating in the barrier, generating a notification network message and sending the notification tuple to each process to notify each participating process of the barrier completion.

In accordance with a further aspect of the invention, there is provided a system for implementing a barrier network for a plurality of processes running at one or more distributed computing nodes sharing a coordination namespace. The system comprises: a controller circuit associated with a node of the barrier network, the controller circuit configured to perform a method to: receive a setup barrier message having parameters indicating a barrier name and a value representing a number of barrier tuples associated with the processes participating in the barrier; allocate, in response to receiving the setup barrier message tuple for the barrier name, at least one named data element in the coordination namespace at the node; subsequently receive a barrier tuple associated with each process participating in the barrier at the node indicating when the participating process has reached the barrier; and responsive to receiving barrier tuples from all processes participating in the barrier, generate a notification tuple and sending the notification network message to each process to notify each participating process of the barrier completion.

The present invention is advantageously employed in a multiprocessing computer system having a plurality of processor devices each competing for access to a shared memory structure, however, can easily be adapted for use in multi-core uniprocessor computer systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

The present disclosure provides a novel hardware acceleration mechanism to support barriers between the participating processes in a multi-node computing system. Additionally there is provided a system and method that architects a tree structure to provide an efficient way of scaling the number of processes in a tuple space/coordination namespace.

The description makes use of and extends the Coordinated Namespace (CNS) system and methods described in commonly-owned, co-pending U.S. patent application Ser. No. 16/217,905 entitled Coordinated Namespace Processing, the whole contents and disclosure of each of which are incorporated herein by reference as if wholly set forth herein.

The following are abbreviations of terms representing entities involved in the various system and methods herein for synchronizing communications in a CoordinationSpace (CS) or CoordinationNameSpace (CNS) system.

An ActualHome (AH) or Home, is a node where the named data element of tuple is actually stored.

A NaturalHome (NH) is a name of a node obtained from the hash applied to the tuple name, always informed.

A PreferredHome (PH) can be a NH or from a user-specified group, AH for OUT, where to look first for RD/IN.

A LocalNode (LN) is RequestNode (RN) representing a node where a request originated.

A HashElement (HE) refers to a single (one) record per unique name in CS, e.g., one HE per multiple tuples of the same name.

A PendingRecord (PR) is a tuple record that record the metadata of a tuple itself or a pending request for them.

A LocalTuple (LT) represents a metadata record at the actual home.

A RemoteTuple (RT) represents a metadata record at the NH about tuple homed elsewhere.

Storage class memory (SCM) is a persistent memory extending dynamic memory (DRAM).

A Work queue (WQ) is a hardware work queue; and WQM is a hardware work queue manager. The work manager can be a FPGA (field programmable gate array) to implement the work queue/tuple engines. Alternately, the work manager functions can be a programmable accelerator implementing these functions.

Figure 1:
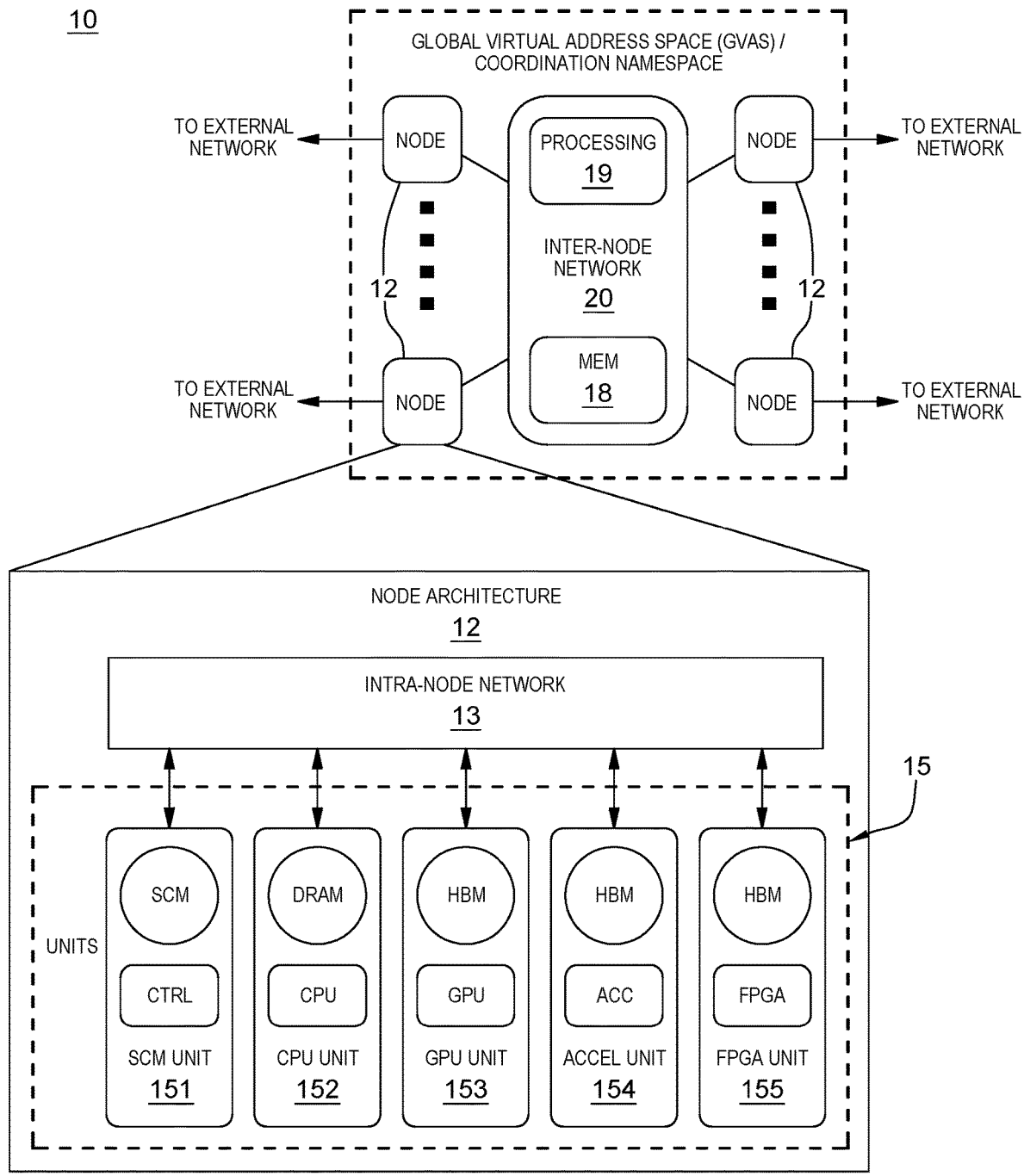
FIG. 1 illustrates an extended memory architecture constructed using a node architecture of multiple processing nodes in which the present systems and methods are employed according to embodiments herein.

FIG. 1 depicts a schematic diagram of a multi-node computer system in which a hardware barrier implementation system and method of the invention are employed. FIG. 1 is particularly illustrative of an extended memory architecture 10 constructed using a node architecture of multiple processing nodes 12. At the conceptual level, this architecture enables constructing a system from "units" 15 that combine memory pools and processing capability. In an embodiment, multiple types of units 15 are possible. A node 12 may contain a single unit or multiple units 15. Examples of units 15 in a node, may include a memory service unit (Storage Class Memory Unit) 151, a Sequential Processing unit (e.g., a DRAM and CPU) 152, a Throughput Processing unit (High Bandwidth Memory and Graphic Processing Unit (GPU))) 153, and acceleration unit 154 or Field field-programmable gate array (FPGA) unit 155.

Unlike previous architectures where GPUs and accelerators are dependent on the host processor, units are independent and treated as peers under the extended memory architecture 10. These units may be optimized for specific computational and memory task. The architecture depicts a collection of units where intra-node network 13 provides an efficient coherent interconnect between the units within a single node 15 and Inter-node network 20, e.g., Ethernet or Infiniband® or like network, interconnecting the computing nodes 12 within the system 10. Similar to a unit, the Inter-node Network 20 may also contain memory 18 and associated processing 19. The "external networks" identify access beyond the extended memory architecture 10.

In embodiments, methods are implemented for dynamically creating a logical grouping of units from one or more Nodes 12 to perform an application, wherein at least one of these units can run an operating system including a master process (not shown) that can setup the CNS system and setup barrier networks. The units 15 may be, for example, a combination of general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a node 12 to an application. A system manager (not shown) may schedule jobs that run over the full set of nodes in the system, start jobs (applications or workflows), and assign the resources at job launch when the required resources are available.

As described in herein incorporated co-pending U.S. patent application Ser. No. 16/217,905, the extended memory (EM) architecture 10 architecture for accessing memory beyond a node 12. The EM architecture includes a method for accessing memory referred to as Coordination Namespace (CSN) methods distributed over the full system. Nodes within the extended memory architecture have major characteristics: (1) Capable of being managed by a single operating system; (2) Efficient coherent load/store access to all memory pools within the node; (3) a Global Virtual Address Space for referencing memory pools inside and outside the node; and (4) access to a system wide Coordination Namespace.

As described in commonly-owned, co-pending U.S. patent application Ser. No. 16/217,905, the Coordination Namespace (CNS) is a hardware system implementing methods providing support for treating system memory or storage class memory as a key/value store with blocks of data referenced using a "name" or key.

Figure 2:
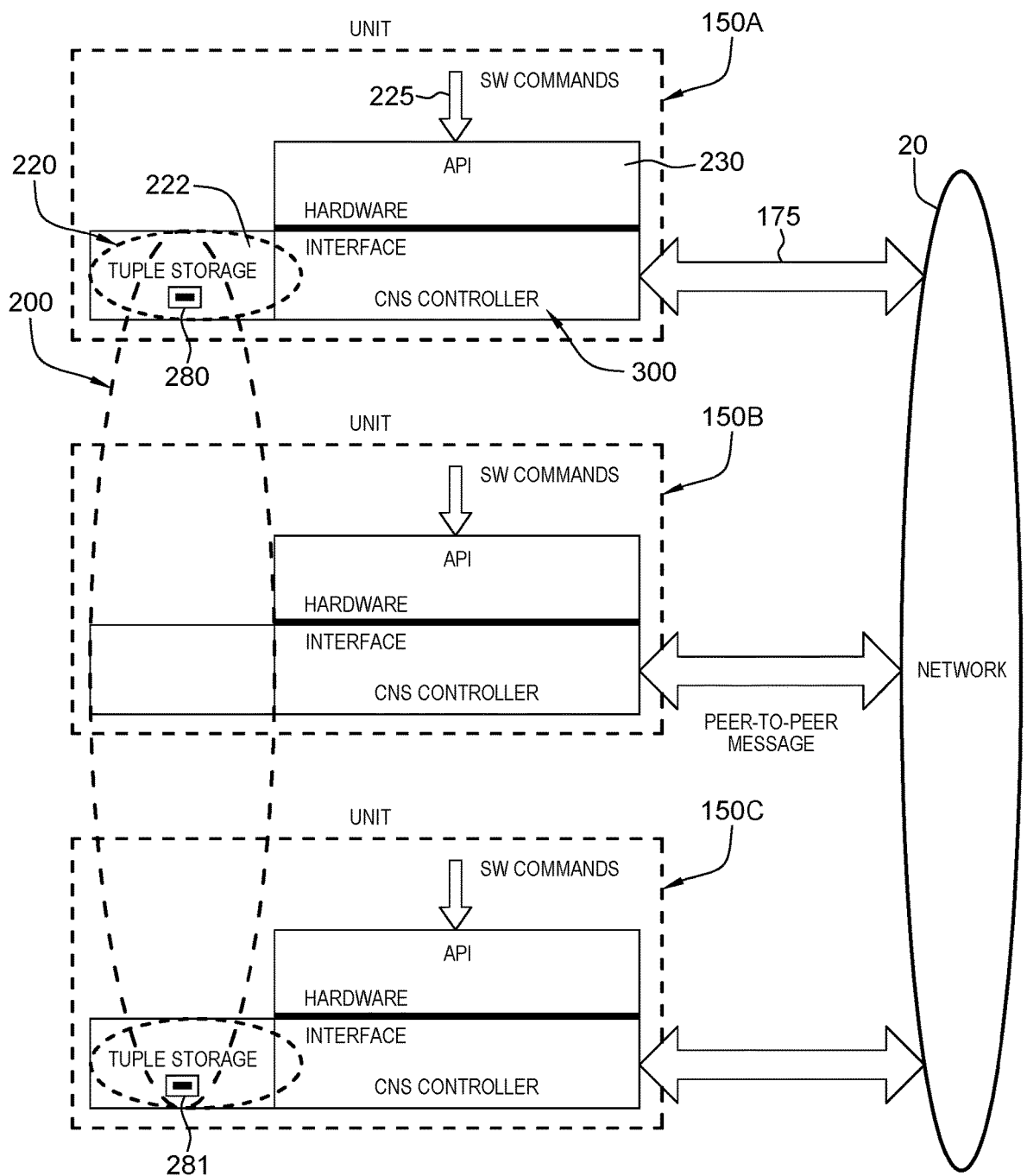
FIG. 2 shows a CNS architecture depicting networked connection of units across one or more nodes of the extended memory architecture of FIG. 1.

FIG. 2 shows a CNS architecture 100 depicting networked connection of units 150A, 150B, 150C . . . etc. across one or more nodes of the extended memory architecture 10. In an embodiment, units 150A, 150B, 150C etc. are independent and treated as peers under the extended memory architecture. These units can be for example, any combination of processors, programmable logic, controllers, or memory optimized for a specific computational/memory task. The architecture 100 depicts a collection of units where inter-node network 20 provides an efficient coherent interconnect between the units across the system.

In an example embodiment, each unit 150A, 150B, 150C . . . etc. contains a pool of memory that is divided into one or more regions each having one of three designations: (1) Globally accessible; (2) NDE storage 220; and (3) Local 222. One embodiment of the extended memory architecture may aggregate memory regions designated as globally accessible into a Global Virtual Address Space and allocate memory regions designated as NDE storage to a distributed Coordination Namespace 200.

FIG. 2 conceptually depicts the Coordination Namespace storage system 200 distributed across units 150A, 150B, 150C . . . etc. in the extended memory architecture. Units, e.g., unit 150B, do not have to contribute to storage. Units 150A, 150B, 150C . . . etc. can access CNS 200 even if not contributing storage.

As shown in FIG. 2, the plural units distributed across nodes of the extended memory architecture include at least hardware one CNS controller 300 that provides access to the Coordination Namespace. The CNS storage structure 200 provides an alternate view of extended memory that is separate from a processes' virtual address space local to the unit. In the Coordination Namespace, references to extended memory use a "name" for accessing a finite, ordered list of immutable values referred to as a Named Data Element (NDE) or "tuple". In an exemplary embodiment, the first field associated with every NDE is its name, a character string with an implementation dependent maximum length. The "name" references a NDE located in the Coordination Namespace. The "name" can simply be the first field, the name, a search template for any set of the fields in the NDE, and the like and may be referenced herein as a "name," a "key," or as a "NDE-name." The Coordination Namespace allows access to NDEs contained within a distributed object store. As shown in FIG. 2, peer-to-peer messaging over network links 175 across network 20 is used for accessing remote NDEs (tuples).

In embodiments, each unit contributing storage is an owner of a set of "groups" segments of the Hash of the "name". CNS storage can be located in system memory or a Storage Class Memory (SCM), or in a File System. CNS completely implemented by software commands 225 received via an application programming interface (API) 230 to the CNS controller 300 if CNS storage is file system based.

The extended memory architecture uses NDEs or "tuples" within the Coordination Namespace system architecture 100 to communicate work between applications. In order to manage the Coordination Namespace, the system may also be associated with a CNS server that manages a Coordination Namespace located in a distributed manner across all or subset of the memory elements of the system. The part of the memory of the system associated with the Coordination Namespace is referred to as the Coordination Namespace memory 200. Parts of this memory may be in the nodes executing the applications, other parts may be in memory dedicated to the coordination. The Coordination Namespace addresses the challenges of moving data between phases of a workflow by providing an efficient means for communication between and coordination of the applications within a workflow. In addition, the Coordination Namespace also addresses the need for keeping certain types of data persistent in memory longer than the duration of a single program or application.

In FIG. 2, one of the CNS controller elements 300 is CNS Server used for accessing the Coordination Namespace memory. The CNS server in particular manages the Coordination Namespace located in a distributed manner across all nodes (each node can have its own CNS server, CNS client, or both) of the system contributing to the distributed memory. A node may contribute all its memory to the Coordination Namespace (node is a dedicated CNS Server), parts of its memory or none of its memory. A node may still access the Coordination Namespace 200 even if not contributing any of its memory. The parts of the memory of the system associated with the Coordination Namespace may also be referred to as the Coordination Namespace memory or distributed memory. Various NDEs, such as NDE 280 and NDE 281 may be located in the distributed memory. In order to process Coordination Namespace Requests such as creating and reading NDEs a hashing of a named data element name (key) at a requesting client yields information about the node at which the named data element is located. This provides a single hop mechanism to locate an NDE.

In an embodiment, CNS Server characteristics include the use of a Hash table to manage tuples owned or naturally homed. In embodiments, a single hash table is provided per CNS node. Additionally, as multiple coordination namespaces can run concurrently on a node, there is more than one hash table per CNS node, Each unit has independent hash tables. There is further provided a Tuple memory in storage class memory and CNS data structures in CNS Controller DDR. A CNS server uses a virtual address space local to the unit for accessing Tuples storage.

A CNS client is provisioned with request queues for locally initiated commands with one queue per process (e.g., allowing access to any open CNS). Doorbells in CNS controller, queues in system memory.

In embodiments, three example access methods are provided by the extended memory architecture: (1) Direct load/store access to memory located within a node. (2) An asynchronous copy method. (3) A NDE access method. The NDE access method provides a set of commands to create, read, retrieve, and destroy NDEs in the Coordination Namespace.

When accessing the Coordination Namespace, the CNS controller (e.g., Client or Server) may perform a distributed hash function on the NDE-name to locate the data and perform the data movement. A CNS Server allows access to NDEs in a distributed system in a similar way as load-store instructions in a typical instruction set allows access to locations in a virtual address space. Furthermore, these NDEs are located beyond an application's virtual address space. NDEs and data in the Global Virtual Address Space may persist beyond the tenure of the application.

In embodiments, each node 12 of EM 10 includes components running methods disclosed herein for implementing synchronization amongst hardware barriers in a coordinated namespace (CNS) extended memory system 100.

Figure 3:
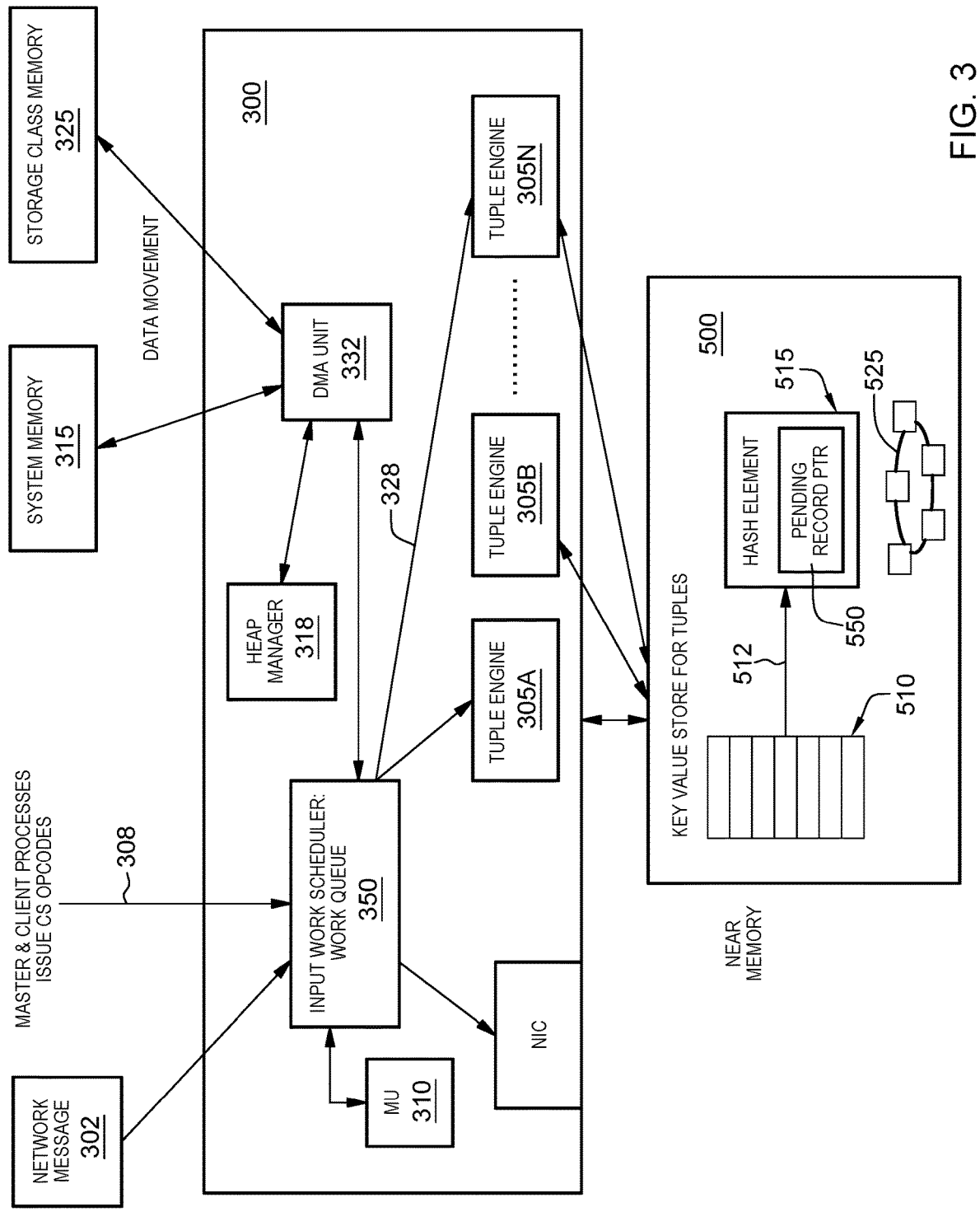
FIG. 3 schematically depicts a high-level schematic of a CNS controller for managing tuples (NDAs) in the coordinated namespace system of FIG. 2 to implement process barriers.

FIG. 3 schematically depicts a high-level schematic of a CNS controller 300 for managing tuples (NDAs) in the coordinated namespace system 200 of FIG. 2 to implement process barriers and synchronize tuple processing relating to implemented barriers. In embodiments, the controller 300 is a field programmable gate array (FPGA) implementation.

In FIG. 3, CNS controller 300 at a node 12 includes one or more tuple engines 305A, 305B, . . . , 305N which are hardware units providing the processing to perform searches for tuples or create/delete tuples as needed in a near memory structure 500 (e.g., a local DDR memory). Computing using the tuple names includes hashing the name which associates for storage at nodes designated as a preferred home or a natural home. In embodiment, tuple engines respond to commands issued by work manager/scheduler 350.

Each tuple engine hardware unit 305A, 305B, . . . , 305N updates local DDR data structure 310, HE, PR, LT, and RT.

Further, each tuple engine: supports pending records processing as it pertains to barrier implementations and accumulator functionality.

In an embodiment, near memory 500 can be a separate DRAM memory that has lower latency with respect to the tuple engines or it can be a partition within a system memory 315. The storage class memory 325 can also be another partition within system memory. A Heap manager element 318 is invoked to allocate/free memory in storage class memory.

In an embodiment, the work manager/scheduler 350 receives/processes software requests 308 (i.e., CSN opcodes) issued by CNS server and/or CNS client processes, and issues new work to the different Tuple processing engines 305A, 305B, . . . , 305N over a ring/bus structure or multiplexor 328. The work requests may be queued in an associated WQ (not shown).

In embodiments, near memory 500 can be a RAM (e.g., DDR3) that stores a hash table 510 that, instead of hash array element values, contain pointers, such as head pointer 512 that points to a first HE 515 and a linked list structure 525 that record the location of tuples or pending requests waiting for tuples. Such a linked list structure 525 may be pointed to by a pending record pointer 550 included in hash element 515. Tuple engines 305A, 305B, 305N traverse the hash table 510 and linked list structures 525 to search, insert or delete tuple records. By calculating the hash of a tuple name, there is provided an index into the table 510 which provides the head of the linked list (i.e. the first item in each list 525).

A direct memory access (DMA) memory processing unit 332 is configured to move data between the system memory and storage class memory. DMA unit 332 further enables the various CNS controller hardware components to access system memory (random-access memory) 315 and/or storage class memory 325 and enable transfer of tuple data between storage, SCM and near memory 400 or vice versa independent of any central processing unit (CPU).

A messaging unit 310 is implemented for supporting the message structure for multi-node barrier tree implementation.

In embodiments, work manager element 350 receives the CNS software requests (e.g. opcode) 308 from master and client processes and keeps track of processes participating in a barrier group. In an embodiment, the work manager 350 can receive network messages, e.g., tuple commands 302, from other nodes participating in the barrier. The work manager 350 implements process for notifying DMA unit 332 to transfer tuple data depending on the CNS opcode being processed. Upon completion, work manager informs the messaging unit 310 to send completion notification to the barrier processing software.

A network interface card (NIC) 375 is provided that interfaces the CNS controller unit 300 to an external network for inter-node communications.

Figure 4:
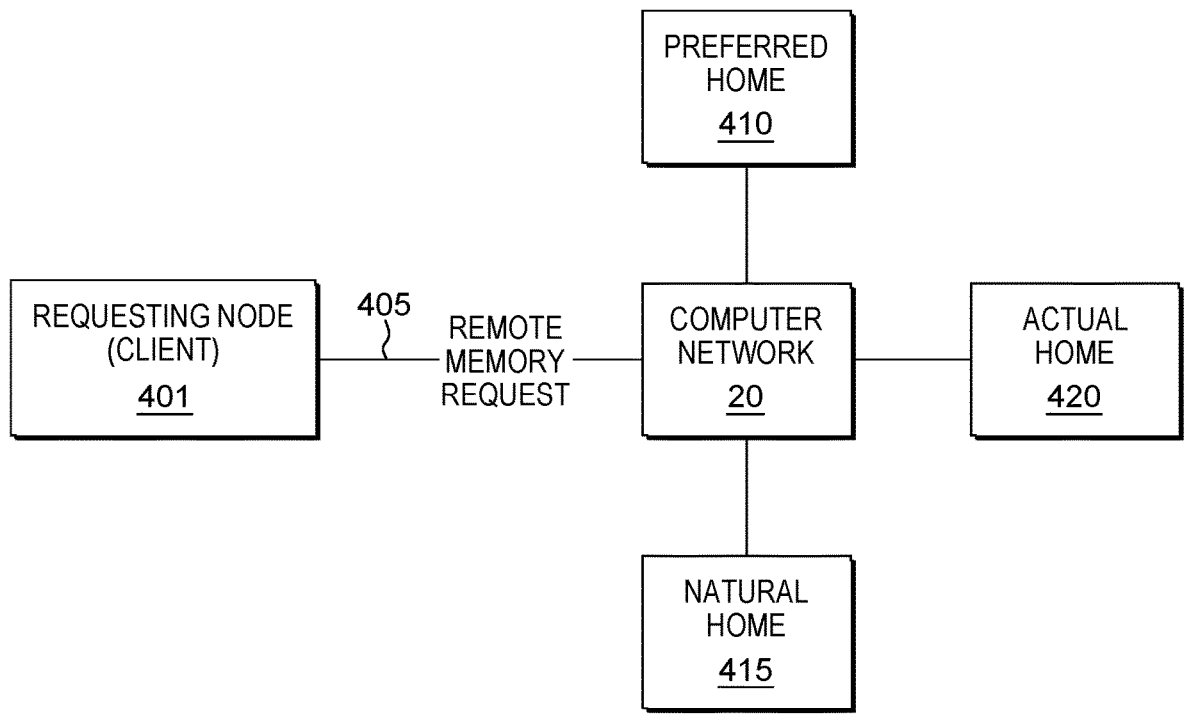
FIG. 4 shows a diagram depicting the homing of a tuple in a Coordination Namespace (CNS)

FIG. 4 shows a diagram 400 depicting the homing of a tuple in a Coordination Namespace (CNS). With respect to running a workflow or application, a requesting Node (e.g., client 401) is the location running the process making the remote memory NDE request 405, i.e., the unit 15 making the tuple command, e.g., including the tuple key or "name". At the CNS controller, the hash algorithm is applied to the tuple-name to identify the Natural Home 410. The Natural Home directly or indirectly indicates the node where the NDE is created or may be found if no other information is provided. The Preferred Home 415 may be provided by the process making the request or by prediction algorithm, e.g. running at the CNS client, for example, by an affinity parameter. The preferred home node can be a desired location, e.g., specified by a user. When supplied, the Preferred Home 415 directly or indirectly indicates the node where the NDE should be created or where to first search for the NDE. The Actual Home 420 identifies the node where the NDE resides. When creating a NDE, the Preferred Home (node) is tried first. If the tuple cannot be created there for some reason, such as out of memory an alternate home is chosen, and that node becomes the Actual Home. When a NDE is created, the Natural Home 410 always keeps a record in the local hash table indicating the Actual Home but does not store the data. In embodiments, a PH could also be the tuple's natural home (based on the hash of the name). The Natural home node will always receive the tuple based on its key hash and make and add an entry in it. When a NDE is requested, the hash table on the Preferred Home (node) 415 is searched first. If the NDE is not found, the request is sent to the Natural Home for recording the dummy pointers for the associated key. The nodes identified by the Natural, Actual, and Preferred Homes can all be different, the same, or any combination. In addition, they can also be different or the same as the requesting node. The communication between the requesting node, the Natural Home, the Preferred Home, and the Actual Home is performed via a the inter-node Network 20.

Figure 5:
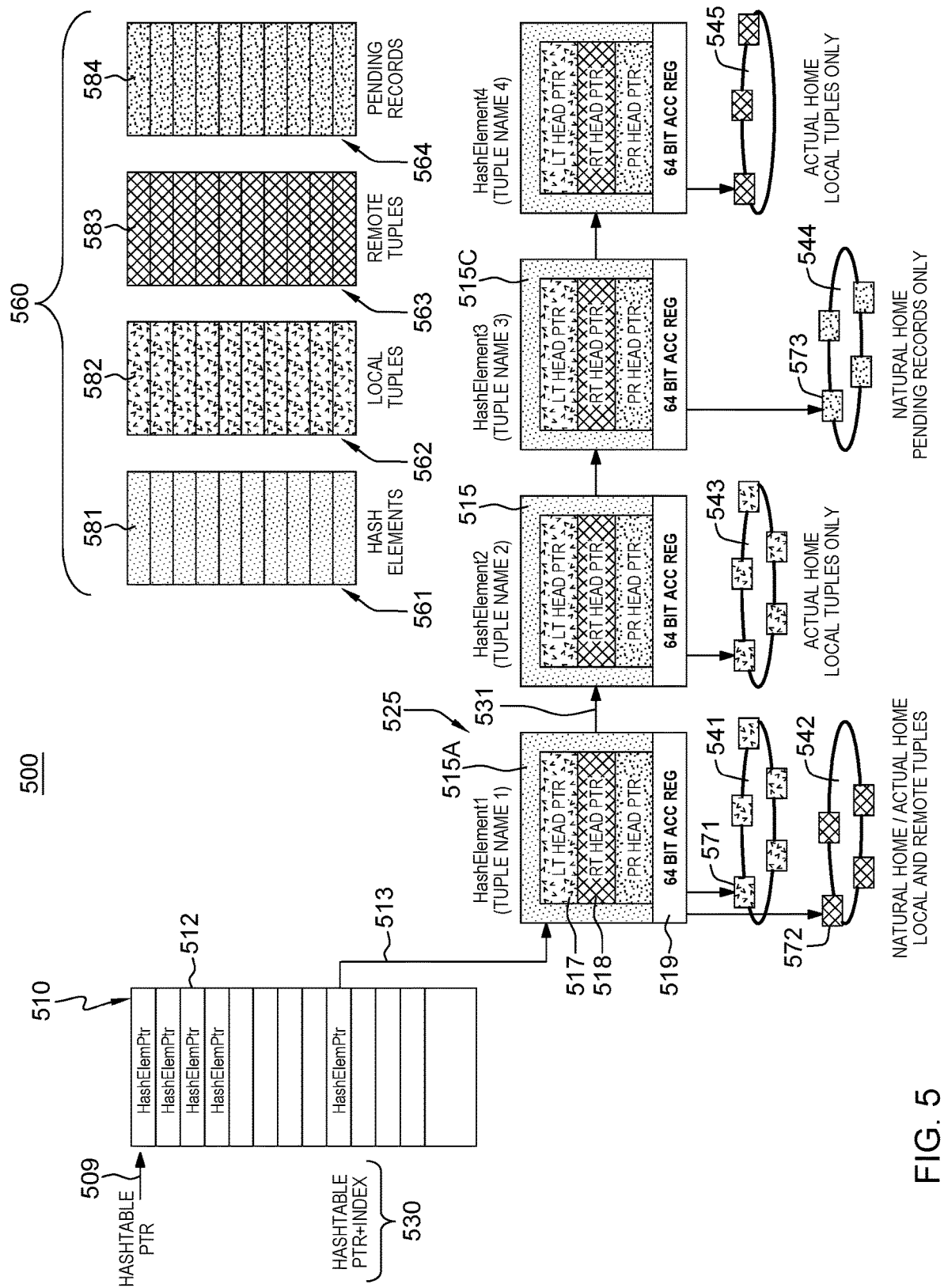
FIG. 5 depicts an implementation of a field programmable array (FPGA) of DDR hash structures in a near memory (e.g. dynamic RAM (DRAM) memory or DDR) used for implementation of hardware barriers in coordinated namespace architecture.

FIG. 5 depicts in greater detail the FPGA DDR hash structures in near (e.g. dynamic RAM (DRAM) memory or DDR) memory 500, or a partition in system memory. In embodiments, the FPGA DDR hash structure is implemented when performing synchronization among nodes implementing barriers. In embodiments, the nodes 12 include a local memory of the CNS extended memory architecture, wherein the barriers are setup according to a multi-tier tree architecture.

As shown in FIG. 5 an FPGA unit 500 provides the hash table 510 in the dynamic RAM (DRAM) memory or a DDR memory, with the hash table 510 containing fixed size structures in the form of a hash table map including hash element pointer entries 512, that point to a corresponding linked list array structure 525 maintaining a linked list of pointers to various types of tuples (e.g., LT, RT and PR) stored at memory locations in the CNS extended memory. In particular, a tuple pointer (HashElemPtr) 512 points to a head pointer of the linked list 525.

In an embodiment, the hash table 510 is initially accessed by a pointer 509 based on a part of the hash value of tuple name of a received tuple command. The hash table map data structure 510 implements a hash function to further compute from the hash value of the tuple name a pointer index 530 for accessing a particular memory pointer element in the table 510 of memory pointers. While multiple tuple "names" can hash to a same index, they are linked as a linked list 525 of hash elements 515 in a linked list structure 525.

For example, as shown in FIG. 5, a HashElemPtr memory pointer 513 points to a first hash memory element, i.e., a first element 515A of a linked list of tuple storage locations in memory 500 which can be used for memory read or write operations in the CNS extended memory. That is, instead of each hash array element values, each item in the hash table map data structure 510 is simply the head pointer 513 to a first hash element item in a linked list 525. By calculating the hash of the received tuple name, there is provided an index 530 into the array table—which in provides the head 513 of the linked list (i.e. the first item in linked list 525).

In embodiments, each hash element 515 in that linked list would be for a unique tuple name, and it is possible to have multiple tuples for the same name, i.e., each hash element 515 is searched to find a tuple name (1 per hash element) and within each hash element 515 is three lists: list of local tuples (actually stored on that node), a list of remote tuples (if the node is NH for that name), a list of tuples that are known that exist somewhere else, and in an event that a request for the tuple came before the data is actually provided, e.g., by receiving an CNS "IN" opcode prior to receiving an CNS "OUT" opcode, the request is saved in a pending record. Each linked list 525 is a linked list of hash elements, with each hash element 515 including one or more of: a pointer 516 to connect to the local tuple(s) list, a pointer 517 to connect to a respective linked list structure of remote tuple(s), and/or a pointer 518 to connect to a respective linked list structure of pending record(s) all for the same tuple name, as well as a next pointer 531 to a following hash element 515 in that linked list 525.

Each of the local tuples/remote tuples/pending records connected to the given hash element 515 are connected themselves as circular doubly linked structures. Thus, as shown in FIG. 5, there are four (4) possible combination of allocation of tuple records in memory 500 as circular doubly linked structures including: 1) a circular doubly linked structure 541 of local tuples, and circular doubly linked structure 542 of remote tuples associated with a tuple name hash element if its a natural home or actual home; 2) a circular doubly linked structure 543 of only local tuples present—indicating for actual home local tuples only; 3) a circular doubly linked structure 544 of only pending records present for a given tuple—indicated for the natural home as PR cannot be present in actual homes; and 4) a circular doubly linked structure 545 of only remote tuples if only remote tuple list is present for a given tuple name—its the natural home for that tuple. In additional embodiments, a combination such as a NH=AH can exist such that both LT list and RT list would be maintained in the same node (e.g., both the natural home and actual home for the tuple).

Thus, as further shown in FIG. 5, the LT head pointer 516 of hashelement1 515A associated with a first tuple name points to a head 571 of double-linked circular list structure 541 of local tuples and the RT head pointer 517 of hashelement1 515A associated with a first tuple name can point to a head 572 of double-linked circular list structure 542 of remote tuples. Similarly, the PR head pointer 518 of hashelement1 515C associated with a third tuple name points to a head element 573 of double-linked circular list structure 544 of pending records. It is understood that a head tuple of the pointers can represent a new hash element taken from free pointer list 560 to record a first open tuple element for that name responsive to a CSOut( ) tuple command without a corresponding entry in hash table 510. When the hash table is searched, and a hash element is already found for the processed tuple name, then the linked list structure is formed by appending a new record for commands received for that same tuple name.

As further shown in FIG. 5, in support of hardware barrier implementation, each of the hash elements 515 each have a 64 bit value register 519 for directly storing the incremented/accumulated immediate count value, i.e., rather than storing it in SCM. Otherwise, this associated field 519 can store a pointer to an SCM location for storing the accumulated value. Thus, for every time a barrier processing instance is associated with a tuple name, the counter at the tuple engine is incremented and the incremented counter value is stored back at the accumulator register 519 at the hash element for that tuple name.

Further, as shown in FIG. 5, there are corresponding four (4) types of free list memory buffers 560—one for each type that is needed to form these linked list structures 541, 542, 543, 544 and 545. As a tuple engine traverses the hash table and linked list structures to search, insert or delete tuple records. When a tuple engine needs to create an entry in these linked structures—it picks it up from the free lists 560 of the given type. As shown in FIG. 5, a tuple engine can pick an entry for a linked list structure from free lists associated with hash element type 561, local tuples type 562, remote tuples type 563 and pending records type 564.

In embodiments, fields for the linked list associated with hash element type 561 include a head of linked lists for local, remote and PR. For example, the fields 581 in free lists associated with hash element type 561 include: address of next HashElem, an address of a previous HashElem, an address of a HashTable parent, an address of a PendingReq (pending request), an address of a LocalTuple, and address of a RemoteTuple, etc.

Further, the fields 582 in free lists associated with Local Tuples type 562 include tuple address in SCM, size and tuple record in details in the NH including: address of the next LocalTuple, an address of a previous LocalTuple, an address of a HashElem parent, an address of actual tuple, a size of the actual tuple, and an address of the NH RemoteTuple.

Further, the fields 583 in free lists associated with Remote Tuples type 563 include details of actual home of tuple and location of tuple record in home hash table structure including: address of the next RemoteTuple, an address of a previous RemoteTuple, an address of a HashElem parent, an actual home unit of tuple, and an address of LocalTuple at home.

Further, the fields 584 in free lists associated with Pending Records type 564 include information to recreate the original request into work queue including: address of the next PendingReq, an address of previous PendingReq, an address of HashElem parent, a Requesting unit, a Requesting pid (process identifier) to facilitate memory address translations between effective address to real/physical addresses, a Requesting address, a Requesting size, aRequesting queue tag and a Request type (RD/IN).

Although not depicted, in a further embodiment, CNS controllers send commands there between in processing of tuples.

For example Coordination Namespace APIs are provided with one coordination namespace access API is csOut( ) which is a command sent from a requesting unit to a NH or PH to take the tuple from requestor and store it, i.e., create it, in the CNS. A csRD( ) is a command sent from a requesting unit to a NH or PH to retrieve a tuple from CNS, and csIn( ) is a command sent from a requesting unit to a NH or PH to retrieve the tuple from CSN and store it in the requestor node (i.e., and removing the tuple from CNS).

Further commands between CNS controllers include but are not limited to:

ForwardedRD/ForwardedIN which is sent from a NaturalHome to an Expected ActualHome and functions to Forward RD or IN request to the expected ActualHome. A Tuple may not exist and then ActualHome rejects command.

A PostedRD/PostedIN command which is sent from a NaturalHome to an ActualHome and is a response to new tuple created with pending request.

A NotFound command which is sent from a PH to a requesting node to indicate that the tuple is not found at the PH.

A Complete CNS tuple command which is sent from an ActualHome/NaturalHome to a Requesting Node indicates a completion sent for the software command.

A Reject CNS tuple command which is sent from an Expected ActualHome to a NaturalHome indicating a ForwardedRD/IN received after a tuple is deleted in CNS.

An Accept CNS tuple command is sent from an ActualHome to a NaturalHome to acknowledge a ForwardedRD or FowardedIN request Tuple data being forwarded to Requesting Unit.

A NewTuple CNS command sent from an ActualHome to a NaturalHome provides a notification of new OUT, and request PendingReqs.

A DeleteTuple command sent from an ActualHome to a NaturalHome to notify that an IN command has removed tuple.

A DeleteTupleAck command sent from a NaturalHome to an ActualHome indicates it is safe for the ActualHome to remove Local Tuple.

In embodiments, a requesting node 401 can issue a software API "csOut( )" (hardware opcode=csout) which is invoked to request creation of a new tuple in the CNS, e.g., taking the tuple from request to store in CNS system 200.

The processing of the CSOut( ) command message to create a tuple for storage at a node include steps of: receiving, at a node from a requesting node, a User Req CSOut, and in response, checking at the workload scheduler whether the node is the preferred home for the tuple, e.g., check if node=preferred home. If the node receiving the CSOut( ) command is not the preferred home, then the messaging unit sends the CSOut( ) message to the preferred home for processing that tuple. If the node receiving the CSOut( ) command is the preferred home, then the tuple engine at the node will check the hash of the tuple name and compute a hash entry address. Further the tuple engine at the receiving node issues a Read head pointer in the Hash table and searches or scans any associated hash element linked list structure for the corresponding entry in the DDR memory 500 to determine whether a tuple had been created for that tuple name.

The tuple engine will further check the response received from the DDR memory on board the FPGA unit 500, or alternatively, the system memory or any near memory which is faster/lower latency than the storage class memory, compute a next address of hash element and issue a Read hash element. Further, the tuple engine will check the DDR response, check the tuple name in hash element; and determine whether the tuple name matches the request. This process of computing next hash element address, reading the hash element and determining whether the tuple name has been created in a hash element is repeated continuously until reaching the end of the linked list structure.

That is, as long as the tuple name of hash element linked list structures does not match the request, then the tuple engine will obtain the head of local tuple list and issue a DDR read request for first local tuple. Then, the tuple engine gets the next pointer of retrieved tuple, and Issues a DDR read request for next local tuple in list. The process of reading from the DDR is repeated until the last element of the linked list is read.

If, while traversing the linked list structure, it is determined that no tuple (hash element) has been created to match the tuple name requested, a new hash element is created from the free pointer list and it is inserted into the list and a first record of the tuple name is created as a tuple hash element. That is, the CSOut( ) method will obtain a free pointer for the local tuple record and writes a new tuple record with the location of data in the SCM. The tuple engine then completes processing, notifies the work scheduler/user of the completion and notifies the Natural home of new record.

Upon scanning by the tuple engine, if a tuple hash element has already been created for the received tuple name in the linked list indicated in the CSOut( ) request, then a new record is created in the associated linked list structure for that hash element.

In embodiments, the requesting node can issue a software API "csIn( )" (hardware opcode=csin) which is invoked to retrieve and remove a matching tuple from CNS. In CNS processing of the CSIn( ) command at a node can include steps of: receiving, at a node, a User Req CSIn, and in response, checking at the workload scheduler whether the node is the preferred home for the tuple, e.g., check if node=preferred home. If the node receiving the CSIn( ) command is not the preferred home, then the messaging unit sends the message to the preferred home for processing thereat. If the node receiving the CSIn( ) command is the preferred home, then the tuple engine at the node will check the hash of the tuple and compute a hash entry address. Further the tuple engine at the receiving node issues a Read head pointer in the Hash table and search for the corresponding entry in DDR memory. In an embodiment, if the tuple record is not found in preferred home, then this request gets sent to the natural home where information on the tuple record will be found. This might be in the form of a remote tuple that informs where the actual home is for the record. If not found, it becomes a pending request record.

The tuple engine will further check the response received from a memory controller of the DDR memory, compute a next address of hash element and issue a Read hash element. Further, the tuple engine will check the DDR response, check the tuple name in hash element; and determine whether the tuple name matches the request.

If the tuple name does not match the request, then the tuple engine will continue to check a response from the DDR memory controller.

If the tuple name does match the request, then the tuple engine will obtain the head of local tuple list and issue a DDR read request for first local tuple. Then, the tuple engine performs removing the element from linked list, updating the hash element to point to next element in list, and delete the Hash element if it was last element.

The tuple engine then informs a local memory using a direct memory access (DMA) request, to transfer data from the SCM to the local memory. Then a command is issued to update the natural home in response to the removing the tuple. Then, the tuple engine completes processing and notifies work scheduler/user of the completion.

The extended memory architecture 10 of FIG. 1 provides a hardware accelerated mechanism to support barriers between the participating processes. In an embodiment, a tree structure is architected to provide an efficient way of scaling the number of processes. The present methods provide for a method of communication which involves participation of many nodes (all processes) in a communicator, without MPI (message passing interface standard) implementation. As known, systems employing collective communication imply use of a synchronization point among processes, i.e., all processes must reach a point in their code before they can all begin executing again. According to the MPI standard, MPI has a special function MPI_Barrier( ) that is dedicated to synchronizing processes: wherein invocation of the function forms a barrier, and no processes in the communicator can pass the barrier until all of them call the function. According to the MPI standard, software is required to issue the proper memory barrier instruction between sets of load/store operations to ensure a proper order with respect to all devices within the unit (cumulative ordering).

Figure 6:
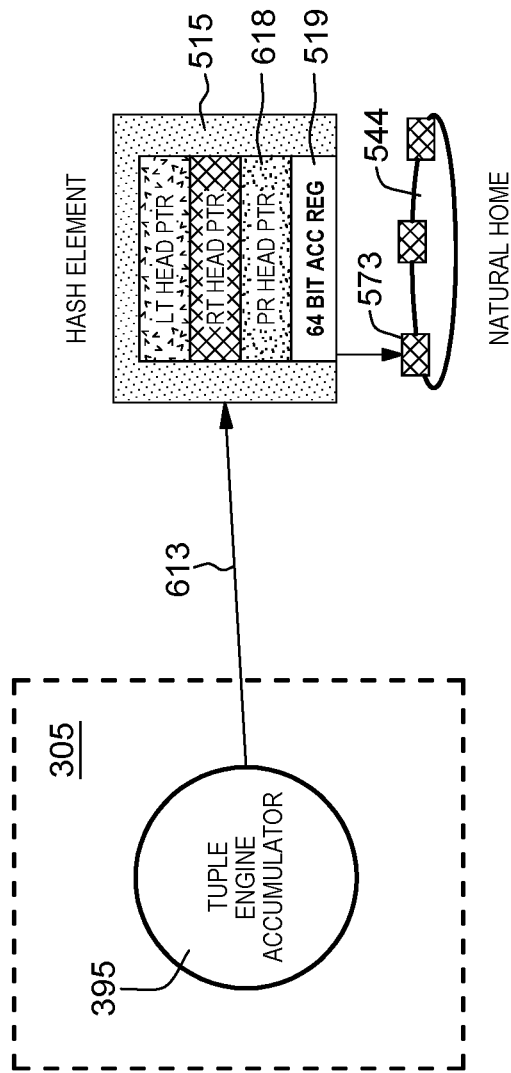
FIG. 6 depicts a tuple engine additionally provided with an accumulator register to support increment/accumulate immediate values (e.g., a count) in a CNS barrier (tuple name) request.

As shown in FIG. 6, for purposes of supporting point-to-point message communications synchronization among hardware barrier elements in the CNS system, a tuple engine 305 is additionally provided with an accumulator register 395 to support accumulator operations, e.g., increment/decrement accumulate immediate values (e.g., a count) in a CNS barrier (tuple name) request. In an embodiment, the count is the total number of processes participating in that barrier. Further, as shown in FIG. 6, the incremented or decremented immediate value is stored directly in a memory location 519 in the hash element. Additionally shown, pointed to by PR head pointer 618 in hash element 515 is a first pending record 573 of a circular linked list of pending records 544 for use in the tracking "out of order" tuple processing. For example, in an embodiment, a CSIN/CSRD tuple command received before a CSOUT will result in creating a pending record 544 for CSIN/CSRD for association with that hash element. The pending records are released when CSOUT for the barrier (tuple) name is issued. It is noted that every time a counter register in tuple engine accumulator 395 is incremented/decremented, by virtue of the tuple engine accessing that same hash element for the same tuple name, the count value is additionally stored in the memory location 519 associated with the hash element 515 created for that tuple (e.g., barrier name).

In embodiments, in support of point-to-point message synchronization in the CNS storage system implementing a barrier, a CNS_Barrier(tuple name) command is issued by a process thread at a node in the coordination namespace. A tuple engine receiving the CNS_Barrier(tuple name) command will check a count stored in the 64 bit ACC Register 519 in hash element 515. Initially, the count value is N (>0) indicating the number of processes participating in the barrier. As long as the count is greater than 0 this means that the barrier is still waiting on processes to join. Upon receipt of the CNS_Barrier tuple command, if the count is greater than 0 (i.e., count>0), then tuple engine will create a pending record, and decrement the Acc register 519. If count=0, then this means that all processes have entered the barrier and the tuple engine completes the CNS_Barrier ( ) barrier and notifies pending records to be processed. Each pending record includes information including, but not limited to: information of who issued the particular request.

In embodiments, each process has its own completion queue (not shown) which is in a process space in system memory and the tuple engine polls it periodically to ascertain if processes are still pending or whether the barrier completion notification has been received. The same queue is also monitored by the process for csOut, csIn, csRd completions that it issued. The tuple engine is at a lower level (hardware) that computes the accumulation register value and when barrier is done—it notifies the work manager which in turn sends a completion message up to software level into the completion queue. A further term, "sub-communicator" refers to a group of processes participating in a barrier.

There are now described methods implemented for supporting point-to-point synchronization among processes/nodes implementing different hardware barriers in a tuple space/coordination namespace extended memory architecture. As event synchronization forces processes to join at a certain point of execution, barriers are used to separate distinct phases of computation and are normally implemented using locks and shared memory. An involved process enters the barrier, waits for the other processes and then all processes leave the barrier together.

Figure 7A:
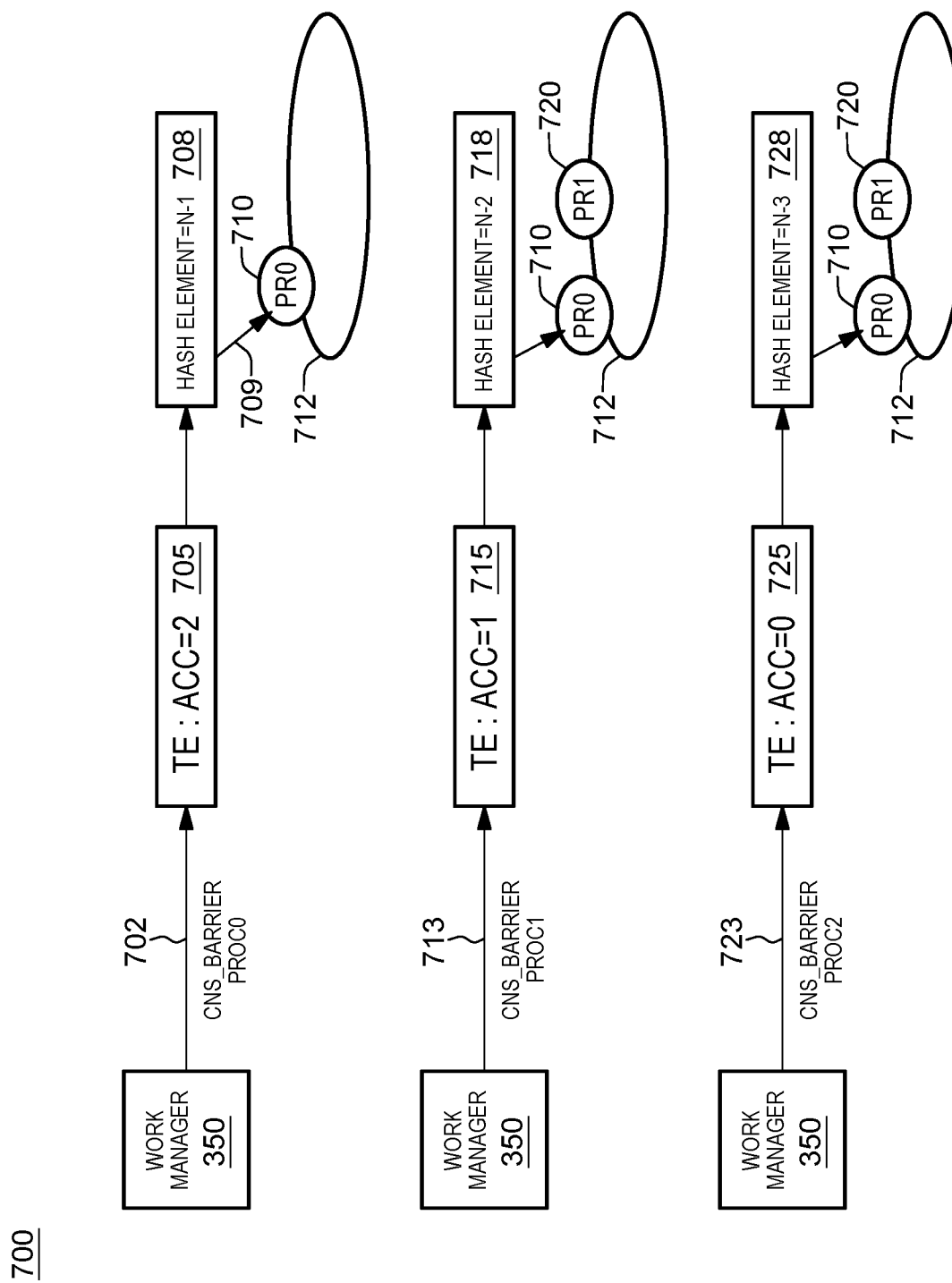
FIG. 7A depicts an example CNS_Barrier accumulation at a single tier, e.g., a natural home, between three (3) processes.

FIG. 7A depicts an example CNS_Barrier accumulation 700 at a single tier, e.g., a natural home, between three (3) processes, e.g., N=number of barrier processes, where N=3. In an embodiment, the Master CNS process sets up a barrier processing at a node running processes requiring barrier. Thus, the master CNS process knows how many processes are in CNS namespace. This could be set in preprocessing at the time of CNS creation and the barrier is updated every time a new process is added/removed from the CNS. A subset of processes be participating in the barrier can form a sub-communicator.

Each process in the CNS Namespace participating in the barrier issues CNS_Barrier function on the same key (i.e., tuple name). In an embodiment, the CNS_Barrier request gets sent to the Natural Home based on the hash of the key. A parameter that identifies the number of participating processes in the barrier is also passed along with the CNS_Barrier function.

In the example implementation shown in FIG. 7A, prior to issuing a barrier, it is decided that three processes are going to participate, i.e., processes proc0, pro1 and proc2. A user running first process, proc0, issues a barrier tuple and issues a barrier request (CNS_Barrier tuple) for process 0 ("proc0"). The workflow manager 350 at the node receiving the CNS_barrier request forwards the request to the tuple engine at 702, and at 705, the tuple accumulator 395 of tuple engine at the node responds by generating an accumulator count value of N−1=2 as it is known beforehand that only 3 processes are participating in the barrier and proc0 is the first process entering the barrier. In response, the tuple engine checks if the hash element exists for that process and if it doesn't, the TE creates a new hash element for that key. As shown, a hash element 708 accessible via the hash table in the near memory, is created for that barrier name (tuple) and the TE creates/appends a pending record 710 for the CNS barrier for proc0 at the head of a linked list structure 712 pointed to by a PR pointer element 709 at the hash element.

As each process issues a CNS_Barrier, this counter goes down and a corresponding pending record (PR) is created. Pending records are created at NH. Thus, when a barrier request is received for proc1, the workflow forwards it to the tuple engine at 713 and the tuple engine at 715 responsively decrements the accumulator count value stored in the tuple accumulator 395 to ACC=N−2=1. That is, as the tuple engine is aware that the barrier is N=3 for that barrier name (tuple), so as proc1 is the second process received, the accumulated count is N−2=1. Further, as a corresponding hash element has already been created for this CNS barrier name (tuple), at 718, a second pending record 720 is created for proc1 and is appended as the next PR of the linked list structure 712.

In embodiments herein, a pending record stores the information of the process that issued the CNS_Barrier request and its request tag information needed for completion. The PR stored information that is typically provided in the initial request received including, but not limited to: the identity of the requestor node, the process ID, a tuple name, what address was requested, and what kind of CNS OpCode.

Finally, when a third process (proc2) of the barrier issues, a barrier request is generated and received for that barrier at the workflow forwards it to the tuple engine at 723 and the tuple engine at 725 responsively decrements the accumulator count value stored in the tuple accumulator 395 to ACC=N−3=0. When this last process issues a CNS_ Barrier—the tuple Accumulator count value of 0 means that the barrier/sync is considered reached. The instruction completes by notifying the work manager, but with the message that there are pending records to be processed.

The tuple Accumulator value of 0 means that the barrier is hit. That is, as the tuple engine is aware that the barrier is N=3 for that barrier name (tuple), so as proc2 is the final process received, the accumulated count is N−3=0. No pending record associated with proc2 need be created as this is the last process entering the barrier.

Figure 7B:
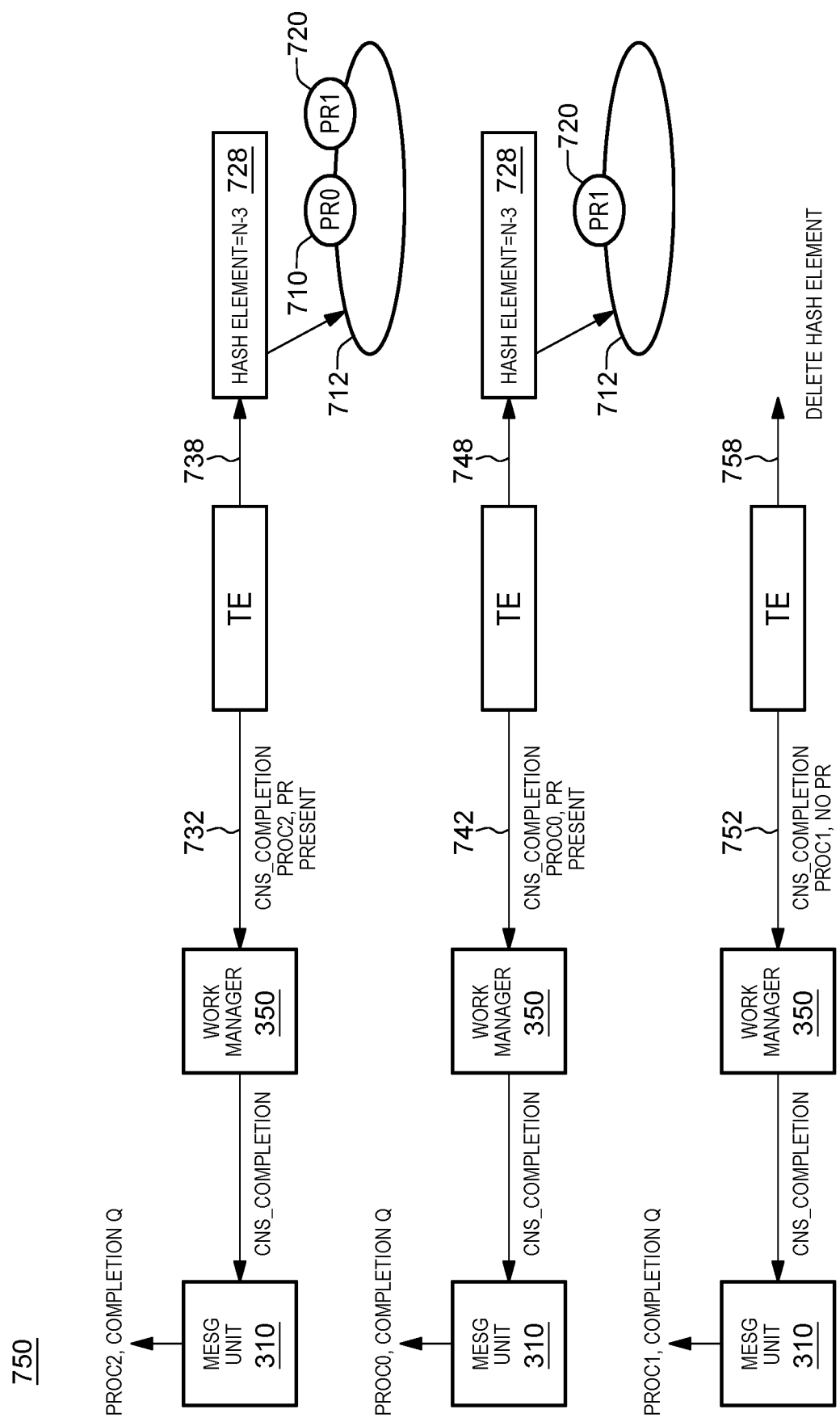
FIG. 7B depicts an example CNS_Barrier completion (cleanup) process for the (3) processes set up in the example single tier barrier processing depicted in FIG. 7A.

FIG. 7B depicts an example CNS_Barrier completion (cleanup) process 750 for the (3) processes set up in the example single tier barrier processing depicted in FIG. 7A. In embodiments, the work manager completes the given CNS_barrier and retrieves the next pending record. Work manager completes each CNS_Barrier by sending the completion details to requesting node's completion queue.

In an example, the tuple engine has polled the completion queues associated with the processes of the barrier to ascertain if processes are still pending or have been completed. Upon determining that the process proc2 completes, the TE at 738 further determines that there are still pending records associated with processes still waiting for completion for that barrier at hash element=N−3. This may be determined from the immediate count value at the memory location at the hash element that maintains the immediate count of processes remaining in the barrier. In an embodiment, the current count at the memory location is loaded into the tuple engine register-which then decrements the value and then stores it back into the hash element. As the value in the tuple engine register gets overwritten by the next hash element search for a different tuple that may be totally unrelated, only the count in the hash element memory is preserved.

The TE sends work manager 350 a CNS_completion message 732 indicating that proc2 has completed but that pending records remain. As long as linked list structure 712 for that hash element contains remaining PRs 710, 720, the work manager 350 does not notify the messaging unit to inform proc2 that the barrier has completed so that it may resume further processing. Similarly, upon determining that the process proc0 completes, the TE at 748 further determines that there is still a pending record associated with a process still waiting for completion for that barrier at hash element=N−3. The TE sends work manager 350 a CNS_ completion message 742 indicating that proc0 has completed but that pending records remain. As long as linked list structure 712 for that hash element contains a remaining PR, e.g., PR 720, the work manager does not notify the proc0 that the barrier has completed. Thus, the last pending record removal will result in tuple engine deleting the hash element. In the example depicted in FIG. 7B, only until such time as TE determines that final barrier process pro1 has completed, will the TE delete the hash element (=N−3) at 758 and inform the work manager 350 with a CNS_completion signal indicating that proc0 has completed and that there are no PRs remaining. Responsive to this message 752 will the work flow manager 350 inform the messaging unit of the barrier CNS_completion such that individual CNS_completion signals may be broadcast to the respective proc0, pro1 and proc2 processes indicating that the barrier has completed. Completion queues for each process receives the notification of the completed CNS_Barrier. Each process polls on this queue for all completed CNS transactions. When it encounters the CNS_Barrier completion record, it knows the check point barrier has completed and these processes may resume further operations.

FIGS. 8A-8D depict an example multi-nodal, multi-tier CNS_Barrier processing in a tuple space/CNS namespace extended memory architecture. In the embodiments depicted, processes are first mapped to nodes of a tree, e.g., a hierarchical tree of degree k. CNS_Barrier requests issued by process will have parameters to indicate number of tiers, preferred home, tier-n natural home. For example, a requestor unit or node issues a CNS_barrier (key, tier, home location) tuple to setup a CNS barrier where parameters set are the key or barrier name, a destination tier (e.g., tier n) where n=1, 2, 3, . . . , etc., and a destination home location, e.g., a PH or a tier-n NH.

Figure 8A:
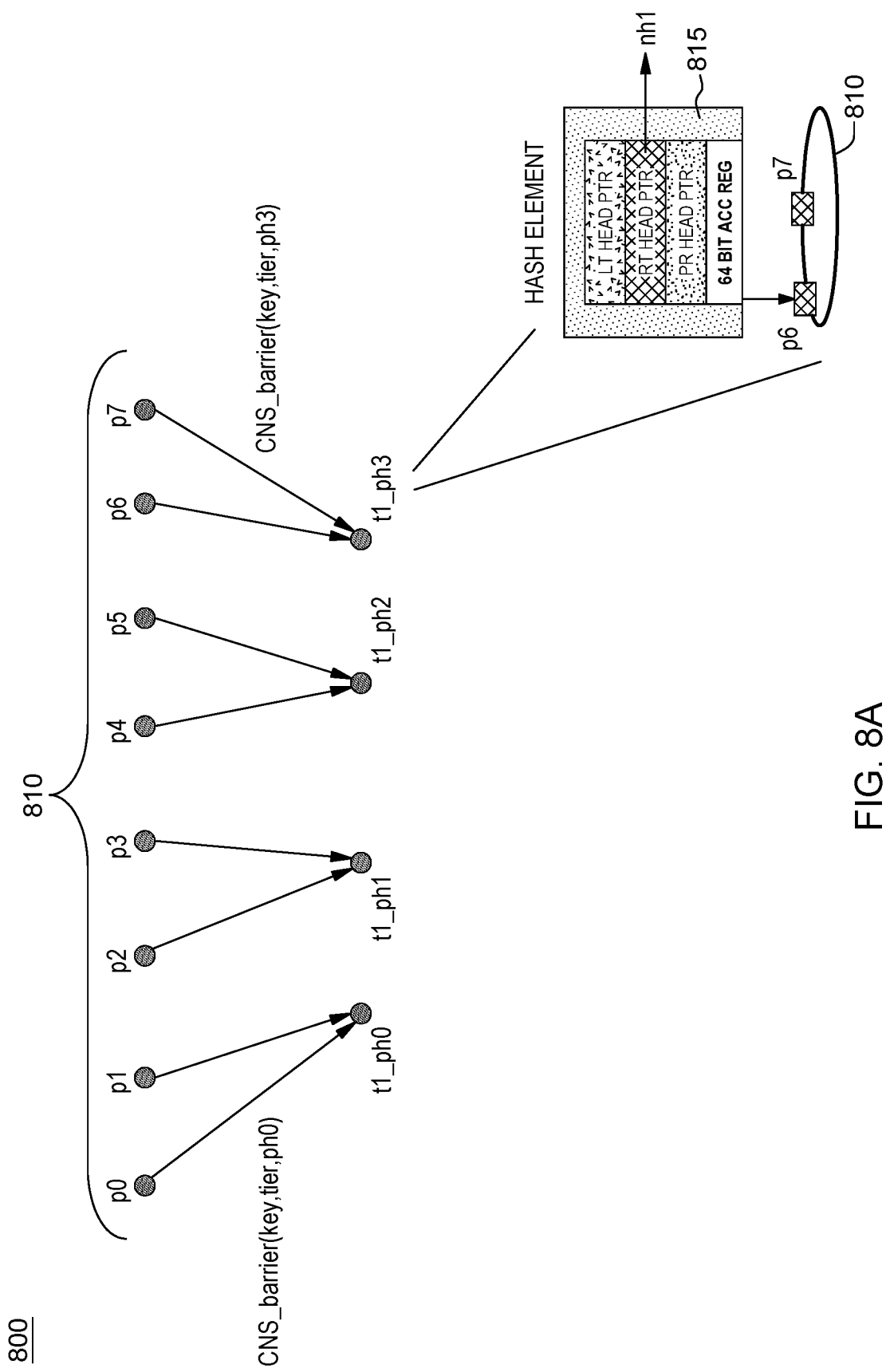
FIGS. 8A-8D depict an example multi-nodal, multi-tier CNS_Barrier processing in a tuple space/CNS namespace extended memory architecture.

FIG. 8A shows an example scaling a large number of processes 810, e.g., processes p0, p1, p2, p3, p4, p5, p6 and p7 by mapping them to fewer CNS barrier nodes operating at a first tier of a multi-tier, multi-nodal CNS tree based barrier network 800. In an example, each process can be associated with a different distributed node in the CNS system.

In an example, tuple message requests for entering the barrier are collected at a given preferred home according to the index calculated from the key (barrier name). Thus, as shown in FIG. 8A, a requestor node issues CNS_barrier (key, tier1, ph0) to map processes p0, p1 to node t1_ph0 (preferred home 0). Similarly, issuance of CNS_Barrier messages map processes p2, p3 to a tier 1 node t1_ph1 and map processes p4, p5 to a tier 1 node t1_ph2. Similarly, requestor node issues CNS_barrier (key, tier1, ph3) to map processes p6, p7 to tier 1 barrier node t1_ph3. These tuple messages inform the tier 1 nodes as to the number of processes expected to reach the barrier at that local node. For example, PH node t1_ph0 has an expectation to receive tuple notification messages when processes p0, p1 reach the barrier. Each tier 1 barrier node creates a respective hash element in near memory pointing to linked list structure of pending records associated to keep track of the mapped barrier processes. All pending records collected at tier 1 CNS barrier nodes t1_ph0, t1_ph1, t1_ph2, t1_ph3 has return information of their respective requesting processes (i.e., child nodes p0, p1, p2, p3, p4, p5, p6 and p7). As shown in FIG. 8A, for example, at node t1_ph3, a tuple engine at the CNS controller creates a hash element in near memory including a linked list structure 810 of pending records having information associated with processes p6, p7 running at that barrier node. As shown, hash element 515 further includes an RT pointer to a natural home, e.g., a node NH1 where information about this barrier tuple is also remotely stored.

In an embodiment, when more than two tiers are needed for accumulation, preconfigured nodes can be used for intermediate natural home nodes. Thus, when a required number of requests are accumulated in the pending records for a given preferred home, a message is sent to the next tier—where the preconfigured natural home is located. If more tiers are required to spread the requests response server, additional levels of pre-configured natural home node(s) could be added.

Figure 8B:
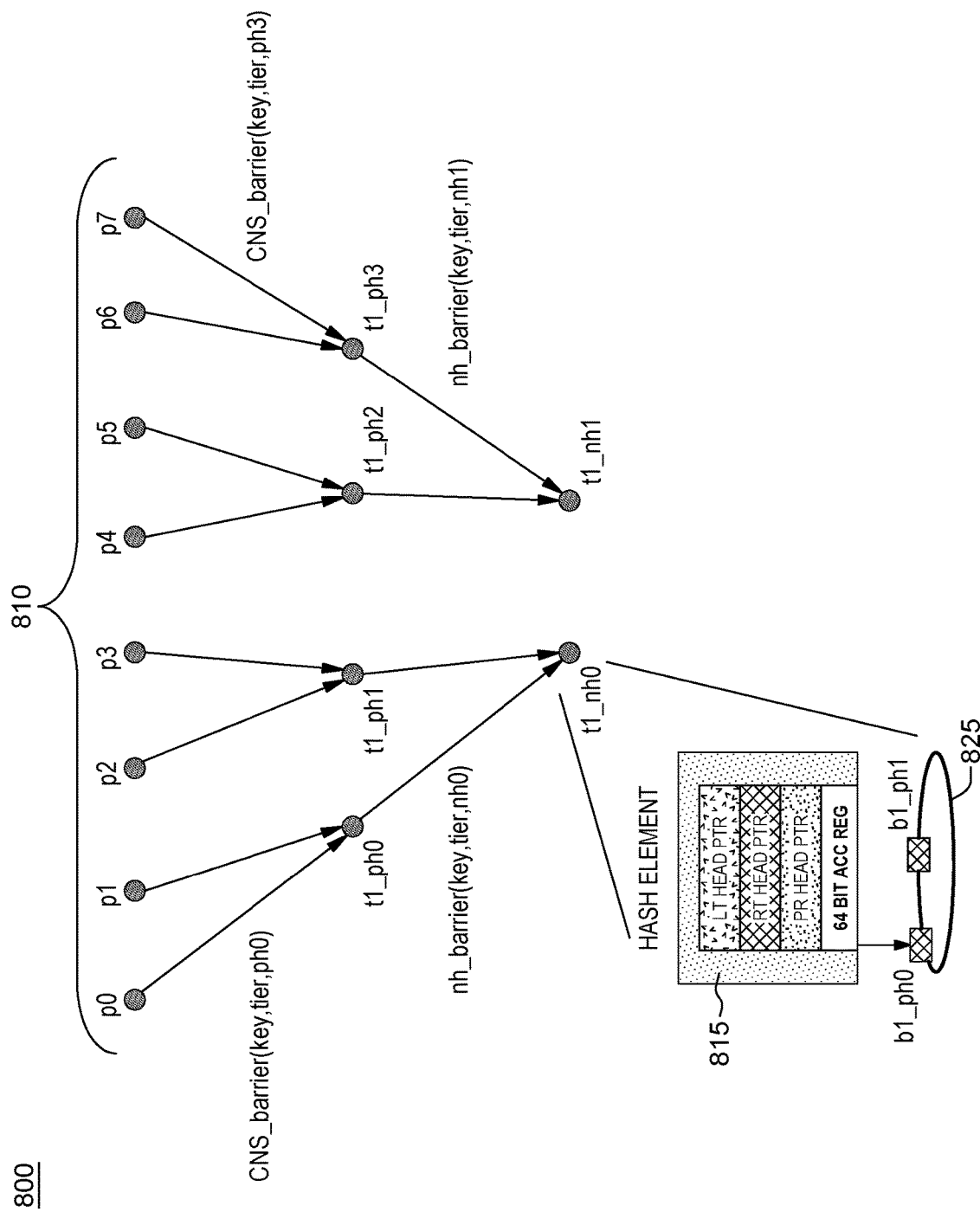

FIG. 8B shows an example scaling the tier 1 barrier nodes as barriers collected at a natural home second tier level, i.e., tier 2 of the tree based barrier network 800. As shown, tier 1 nodes t1_ph0, t1_ph1, t1_ph2 and t1_ph3 as requestors, further issue respective NH barrier setup commands nh_barrier (key, tier, natural home location) to indicate to tier 2 nodes when processing at tier 1 nodes reach the barrier. These tier 1 nodes issue the barrier notification to the mapped next tier node where the key parameter is the same 'barrier name', tier parameter is now tier level (tier 2), and natural home locations are tier 2 barrier nodes t2_nh0, t2_nh1.

Thus, as shown in FIG. 8B, with the barrier in effect, each tier 1 barrier nodes t1_ph0, t1_ph1 will issue a notification tuple command message nh_barrier (key, tier2, nh0) to notify tier 2 node natural home location barrier node t2_nh0 (natural home 0) when they each reach the barrier (complete processing). Similarly, each tier 1 barrier nodes t1_ph2, t1_ph3 will issue a notification tuple command message nh_barrier (key, tier2, nh1) to notify tier 2 node t2_nh1 when they each reach the barrier (complete processing). In response, each tier 2 barrier node t2_nh0, t2_nh1 creates a respective hash element in near memory pointing to linked list structure of pending records associated with the mapped tier 1 barrier node processes for tracking them at the tier 2 level. All pending records collected at tier2 CNS barrier nodes t2_nh0, t2_nh1 has return information of their respective requesting tier 1 hash elements. As shown in FIG. 8B, for example, at node t2_nh0, a tuple engine at the CNS controller creates a hash element 815 in its near memory including a linked list structure 825 including pending records having information requesting hash elements t1_ph0, t1_ph1 stored at those tier 1 barrier nodes.

When the required number of nh_barrier messages are received at the given tier2 natural home node, it sends out another message to the next tier. The messages from previous tier become pending records on this node. These steps propagate to the last tier.

Figure 8C:
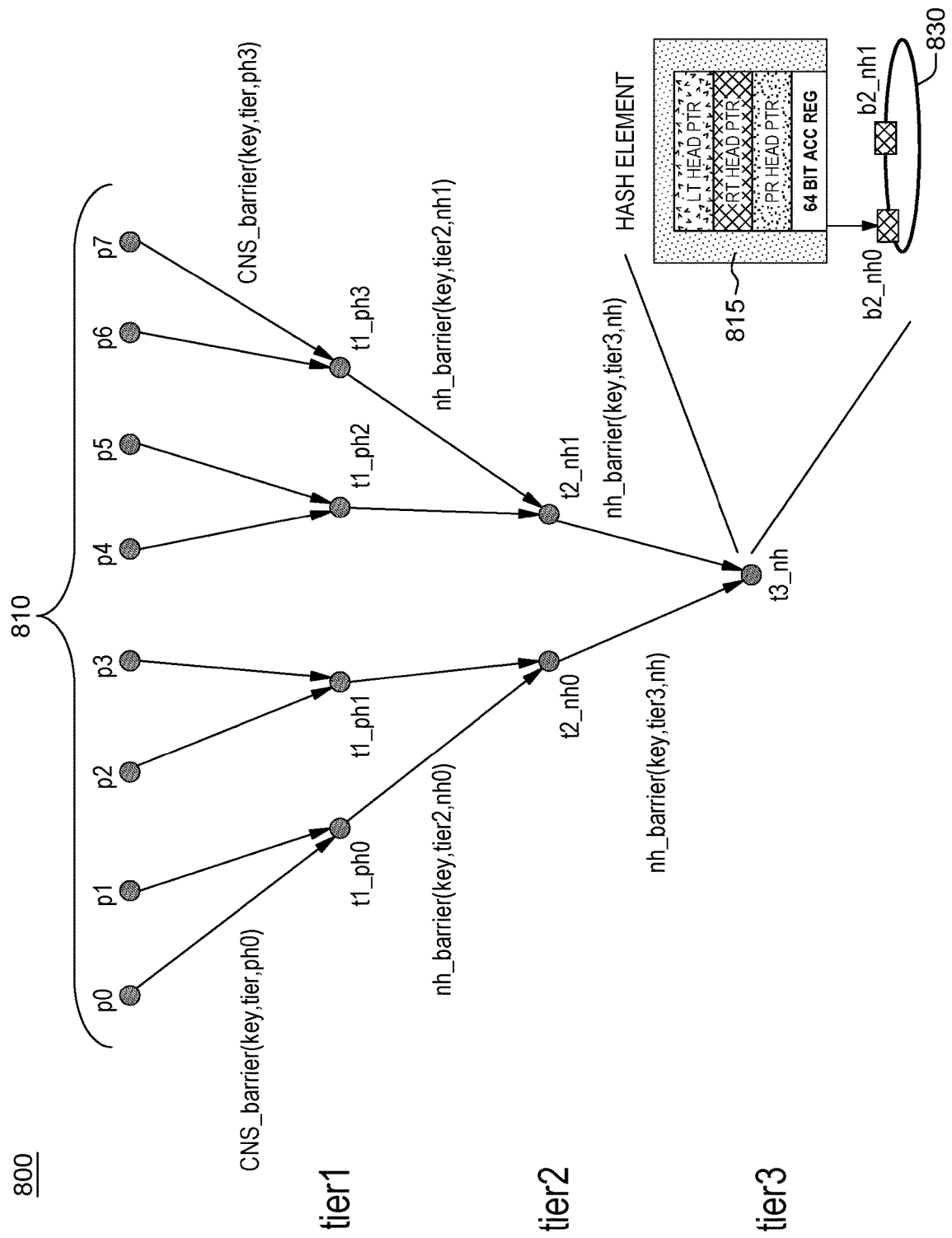

FIG. 8C shows an example scaling of the tier 2 barrier nodes of FIG. 8B, as barriers collected at a natural home third tier (last tier), i.e., tier 3 of the tree based barrier network 800. As shown, tier 2 nodes t2_nh0, t2_nh1 as requestors, further issue respective NH barrier notification commands nh_barrier (nh_barrier (key, tier 3, natural home location) where key is the same 'barrier name', tier is now tier level (tier 3), and natural home location is single tier 3 barrier nodes t3_nh. With the barrier in effect, each tier 2 barrier nodes t2_nh0, t2_nh1 will each issue a notification tuple command message nh_barrier (key, tier3, nh) to notify the top (tier 3) barrier node natural home location barrier node t3_nh (a natural home) when they each respectively reach the barrier (complete processing). Tier 3 barrier node t3_nh creates a hash element 815 in its near memory pointing to linked list structure 830 of pending records associated with the mapped tier 2 hash elements. All pending records collected at tier3 have return information of tier 2 tuple hash elements at CNS barrier nodes t2_nh0, t2_nh1.

Figure 8D:
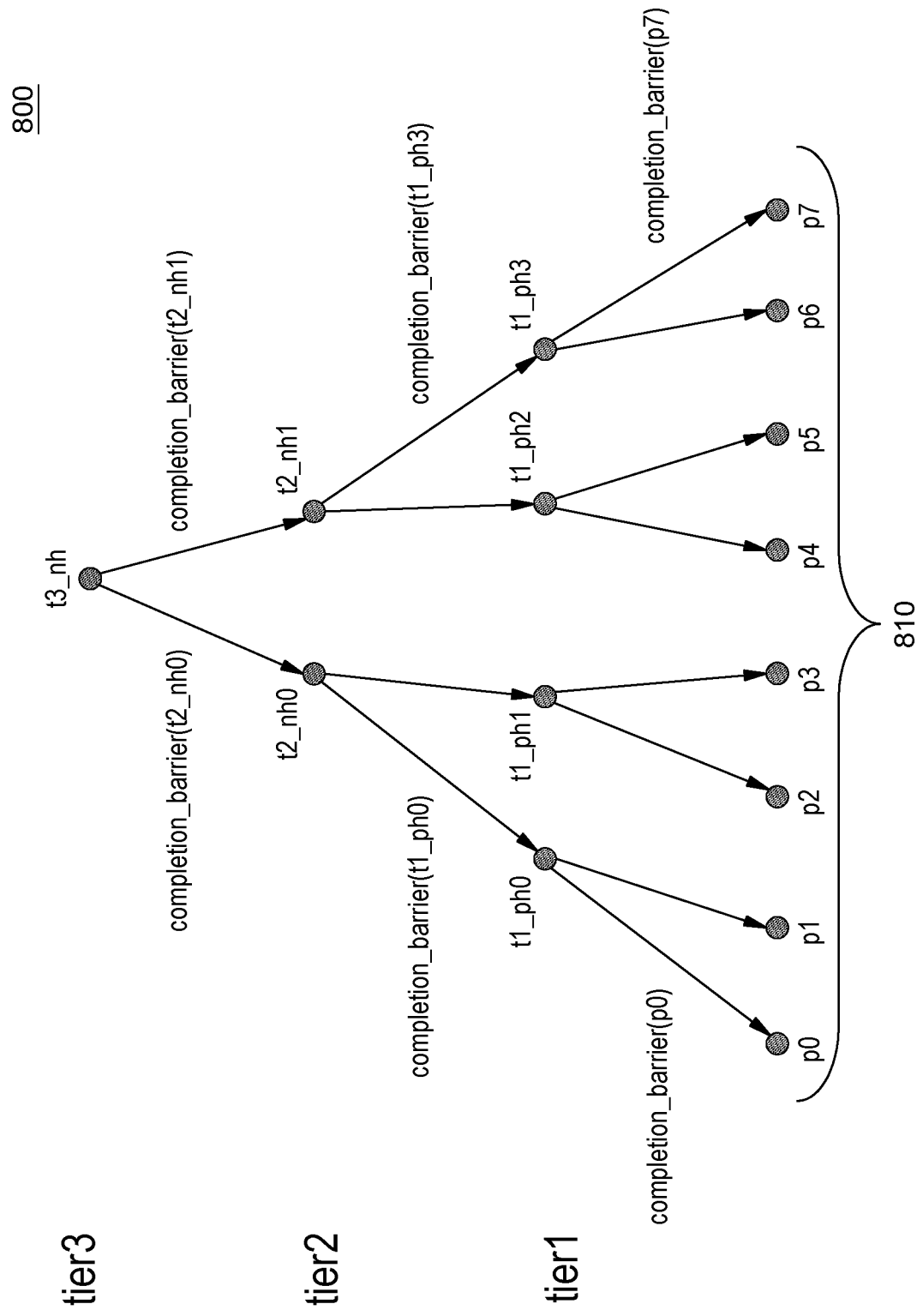

Once the last tier node reaches the accumulated value, it sends completion messages to the pending records in its list. This propagates up to each leaf process as shown in FIG. 8D. The last tier is essentially the calculated natural home of all the barrier tuples based on the barrier name. When tier3 gets the required number of pending records, it sends back completion notification for tier 2 leafs.

Using a collective routine implemented at the CNS controllers at nodes of the barrier tree structure, elements are taken from many processes and gathered to one single process, i.e., a root process such as root process t3_nh in FIG. 8C. With respect to multiple tuples each having the same name, all the tuples of the same name would be gathered at a single location (of a single hash element) because the same name will hash to a same hash element.

Thus, in embodiments herein, the barrier implementation includes issuing a barrier on a particular tuple "name". Thus a tuple engine 305A, 305B, . . . , 305N, working on a particular hash element, can ascertain how many processes are through it. That is, the accumulator register will be incremented for each process being assigned to that tuple name.

In embodiments, tier t2, t3 barrier level nodes of barrier tree network 800 can be CNS servers that exist within the network. They can be a switch in the network.

In an embodiment, tier 1—the nodes send out the completions to the completion queues in system memory. The tuple engine processes monitor these completion queues and get notified that the barrier is complete.

FIG. 8D depicts the methods implemented to perform a completion notification and the propagation of completion messages when the barrier is completed. For example, as shown in FIG. 8D, when tier3 barrier node t3_nh gets the required number of pending records, it sends back completion notification tuple commands, e.g., completion_barrier (t2_nh0) and completion_barrier (t2_nh1) for its tier 2 leaf nodes. Pending records collected at each root node has return information of its leafs.

Tier2 barrier nodes t2_nh0 and t2_nh1 receive the completion notification message from tier3 and, in response, issues completion notification message for its pending records from tier 1. For example, tier 2 barrier node t2_nh0 issues completion_barrier (t1_ph0) tuple command and completion barrier (t1_ph1) tuple command (not shown), tier 2 node t2_nh1 issues respective example completion_barrier (t1_ph2) tuple command (not shown) and completion_barrier (t1_ph3) tuple command, etc. to notify completion of the tier 2 barrier nodes.

Similarly, in response to receiving the propagated completion notification tuple message at tier 2 nodes, the tier 2 nodes generate and propagate the completion messages to tier1 barrier nodes (PH), e.g., a completion_barrier (t1_ph0) message meaning everybody in parent barrier node has reached. The tier 1 nodes receives completion notification propagated from tier2 barrier nodes (NH) and issues completion notification tuple messages to its pending records from requester processes p0, p1, p2, p3, p4, p5, p6 and p7. For example, tier 1 barrier nodes t1_ph0, t1_ph1, t1_ph2 and t1_ph3, each will issue respective completion notification messages for propagation to the respective processes to inform them of the barrier completion. For example, tier 1 barrier node t1_ph0 and barrier node t1_ph3 each will issue respective completion_barrier (p0) and completion_barrier (p7) tuple commands messages to inform respective processes p0 and p7 when the whole barrier is complete.

Referring back to FIG. 1, each node 12 of extended memory architecture 10 includes components running methods disclosed herein for implementing hardware barriers in a coordinated namespace (CNS) memory system 100.

Initially, there is running operating at a computing device software at application level or operating system level one or more master processes that are system aware and configures and sets up the coordination namespace (CNS) processing capabilities on every node 12 of system 10 of FIG. 1. For a particular application, a user may invoke a master process to message all particular multiple nodes 12 for barrier operations. That is, in one embodiment, software of a particular application invokes the master process to notify nodes to become barrier nodes and configure all barrier nodes of a multi-tier hierarchy for barrier processing. These nodes receive a CNS tuple message and in response invoke processes at the node to perform barrier processing.

In an embodiment, the methods employ a master CNS process that performs the following in the coordination space architecture: 1) grouping to a unit mapping table:

which can be set up at a time of coordination namespace creation; 2) setting up of barrier nodes, e.g., barrier nodes can be set up any time during operation, e.g., by issuing barrier_setup and barrier_cleanup commands; 3) attaching clients to the CNS, e.g., when a new process is created and requests are part of CNS; 4) detaching clients from the CNS including, for example, removing a process from the CNS. In an embodiment, the master process can 5) set up a helper thread to handle network communications to other nodes, e.g., at startup.

In an embodiment, after master process setup barrier nodes in the CNS system, each node that is now a barrier node implements a further master process at that node to setup a new hash element for recording pending records associated with participating processes of the barrier.

Figure 9:
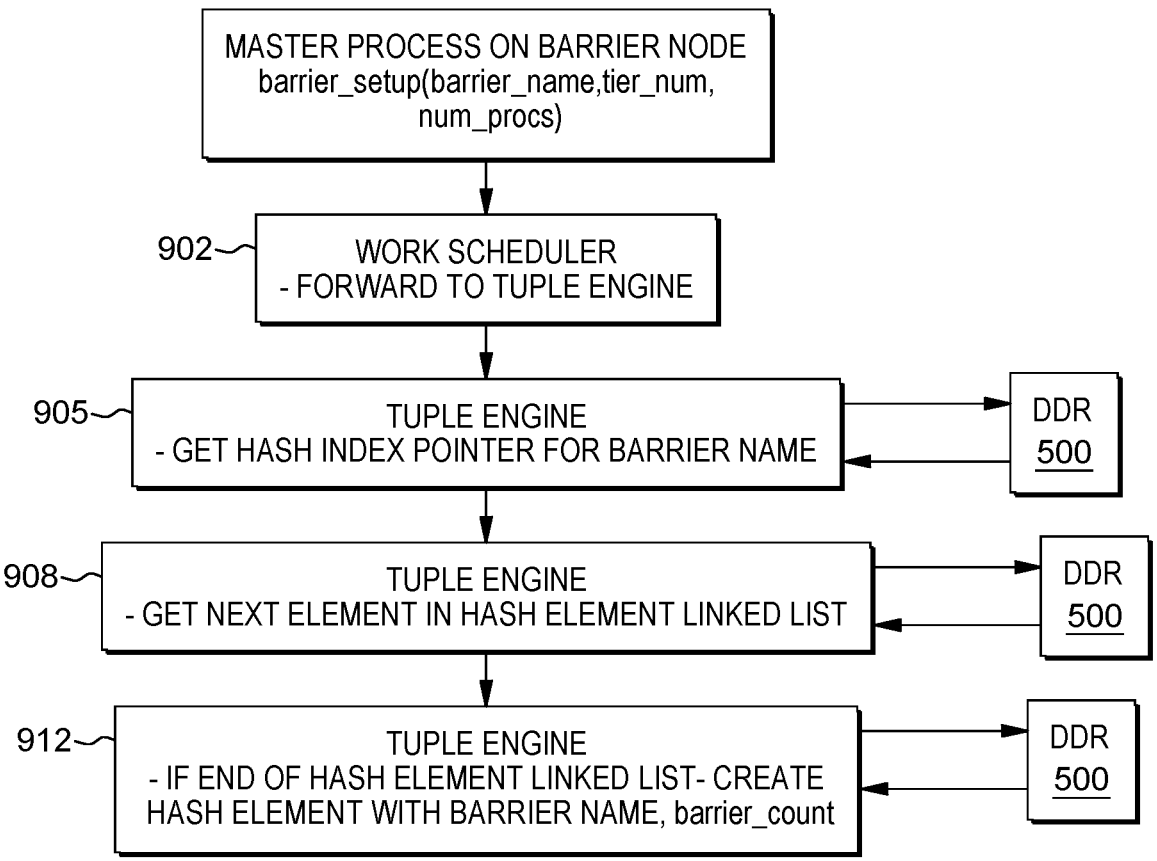
FIG. 9 depicts steps performed by a master process at a computing node for setting up the barrier at that computing nodes in a multi-level barrier tree.

FIG. 9 depicts an embodiment of a master process 900 running on a barrier node used to setup barrier processing at that node. To setup a barrier in a CNS memory architecture at a barrier node, the master process on the barrier node issues barrier_setup command. In an example embodiment, as shown in FIG. 8C, the nodes participating in the barrier are configured as a three tier tree network having a top tier (e.g., a single node), e.g., tier 1, and multiple levels or tiers below the top tier (e.g., tiers 2-3). The barrier_setup command, i.e., barrier_setup (barrier_name, tier_num, num_procs).

include tuple parameters specifying the key, i.e., a name of the barrier (barrier_name), a tier level of the barrier node in the tree network (tier_num), and an identifier or number of processes (num_procs) indicating number of expected processes who will be participating in the barrier at that node.

As shown in FIG. 9, at 902, a Work scheduler at the CNS node receives the barrier_setup tuple request message and forwards it to a tuple engine at the node. Tuple engine communicates with DDR memory 500 to configure a hash table look-up processing and implements processes to perform the following: At step 905, by applying a known hash function, the tuple engine at the node obtains from the hash value, a hash table index pointer for the barrier name specified in the parameter 'barrier_name'. Based upon the hash table index pointer, at 908 tuple engine then performs operations to index the hash table in DDR memory 500, and get the next element in an associated linked list of hash elements pointed to by the hash table. Then at 912 tuple engine performs an operation to create a new hash element at the end of linked list structure of hash elements. The created new hash element is associated identified by Its barrier name, and a barrier_count indicating the number of expected processes who will be participating in the barrier at that node.

Figure 10:
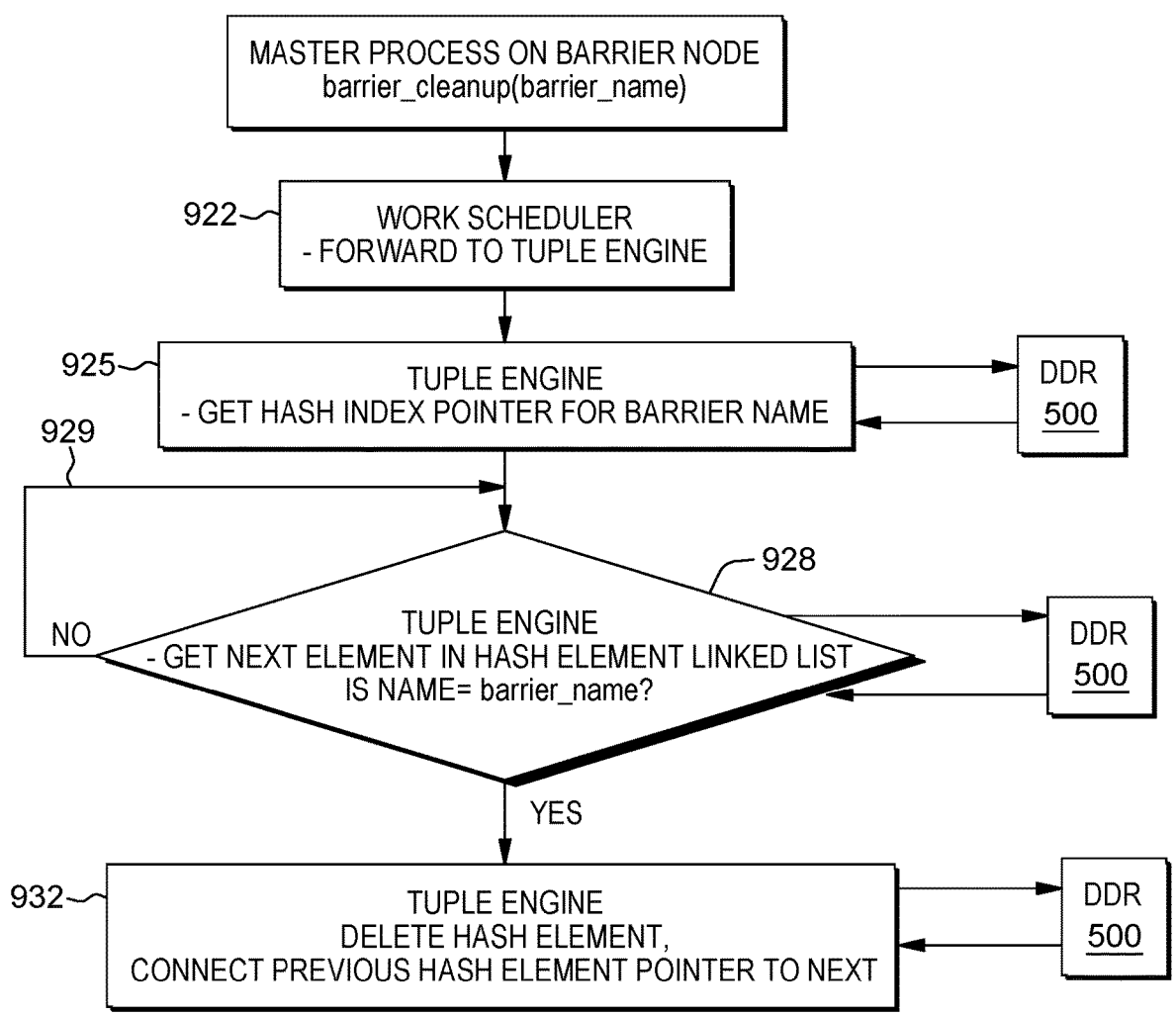
FIG. 10 depicts steps done by master process for cleaning up barrier nodes including tasks of deleting a hash element.

FIG. 10 depicts operations 920 for removing a barrier at a node of the tiered network node participating in the barrier after completion. As shown in FIG. 10, at 922, the Work scheduler at the CNS node at a tier, receives at the same node or from a requesting node over the network, from a master CNS process, a barrier_cleanup command, i.e., barrier_cleanup (barrier_name)

include tuple parameters specifying the key, i.e., the barrier_name of the barrier to be removed at the node and forwards it to a tuple engine at the node. At 925, the tuple engine at the node, by applying a known hash function to the barrier name parameter, obtains a hash index pointer for the barrier name. Tuple engine, at 928, then communicates with DDR memory 500 storing hash table and implements processes to traverse at 929 the linked list structure and obtain the next element in hash element linked list until the name of the hash element matches the barrier name in the linked list for that barrier name. At such time the hash element corresponding to the barrier name in the linked list structure is determined, the tuple engine at 932 then deletes the hash element, and performs operations to connect the previous hash element pointer to a next element in the linked list. In embodiments, the cleanup routing may not be required if the barrier is reused.

In a further embodiment, via the master CNS namespace system process, an application can indicate and issue a notification tuple to all barrier nodes for the barrier to be set up. The tuple message indicates a name of the barrier, and for that barrier name, how many tuple notifications associated with barrier processes it is expected to receive (e.g., a subset of the total number of processes participating in the barrier), and the identification of another destination node that the node is going to send any further notification messages once the associated number of tuple notifications has been received at the barrier node. This is recorded at the hash element level for this barrier. Thus, before a user application starts running, all the multi-tier nodes in the barrier tree are a priori informed that they are barriers and consequently have already set up the hash element memory resource in near memory.

Figure 11A:
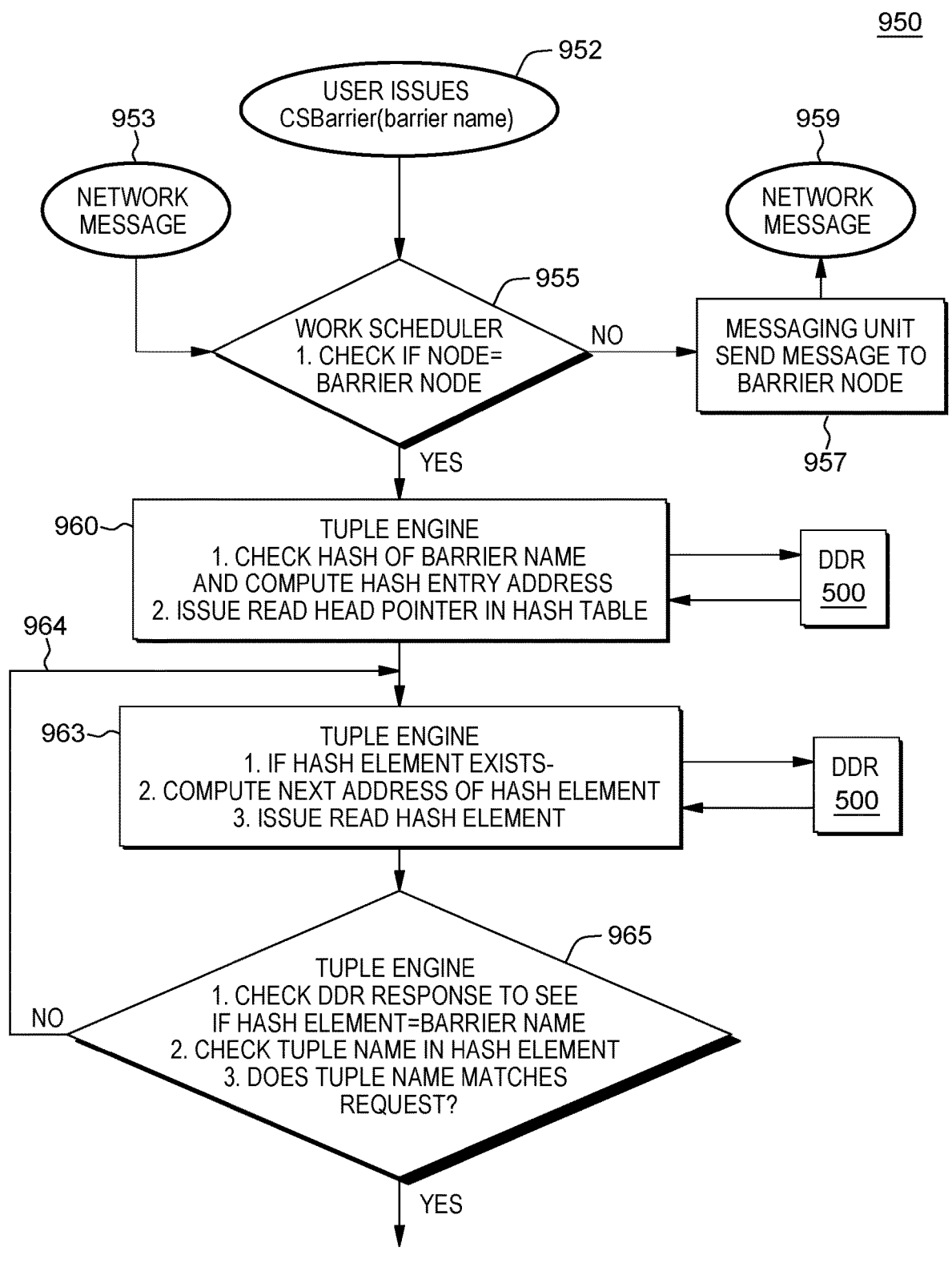
FIGS. 11A-11C show steps for barrier setup and completion where an application level master process did the setup before hand.
Figure 11B:
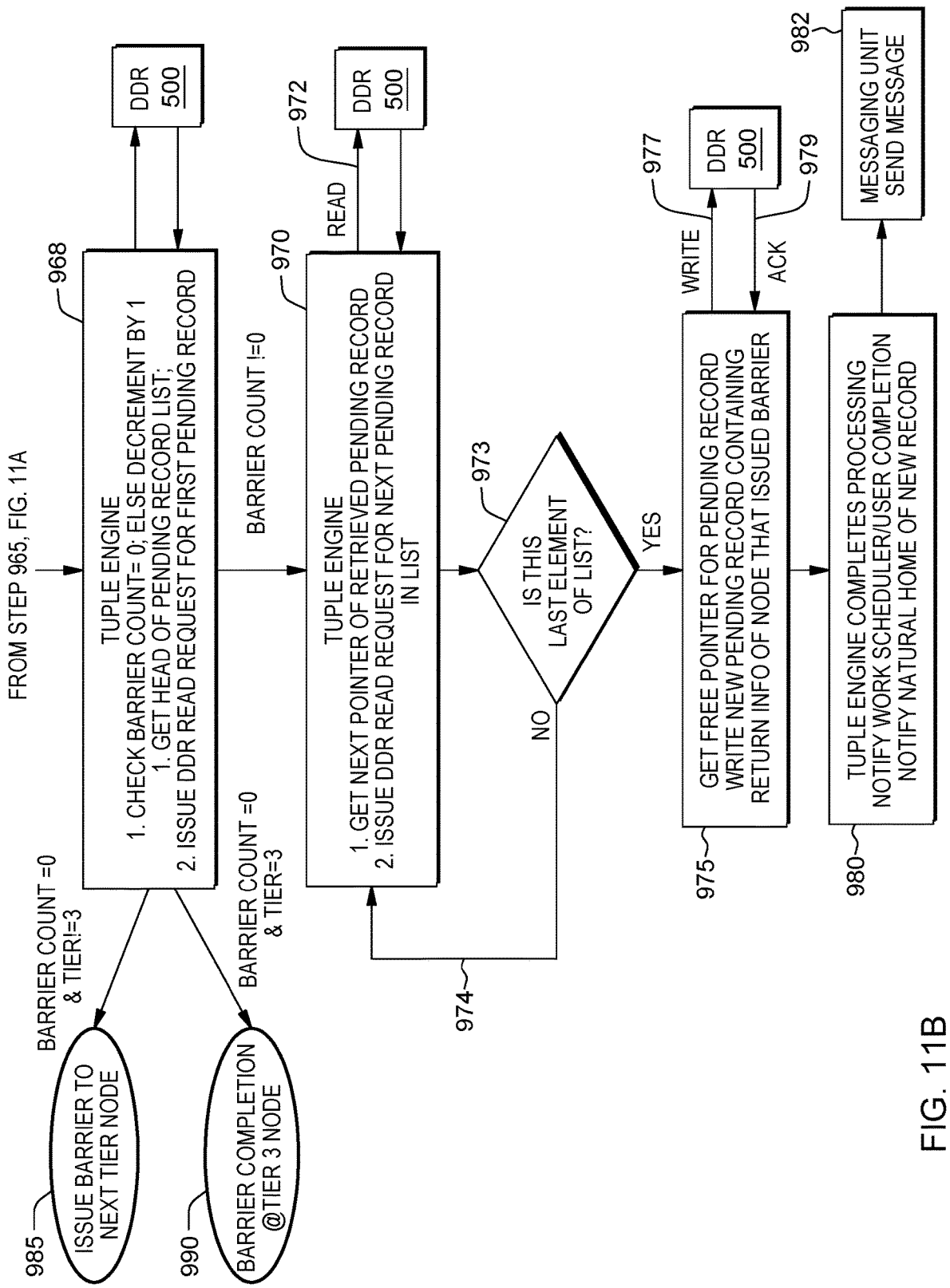
Figure 11C:
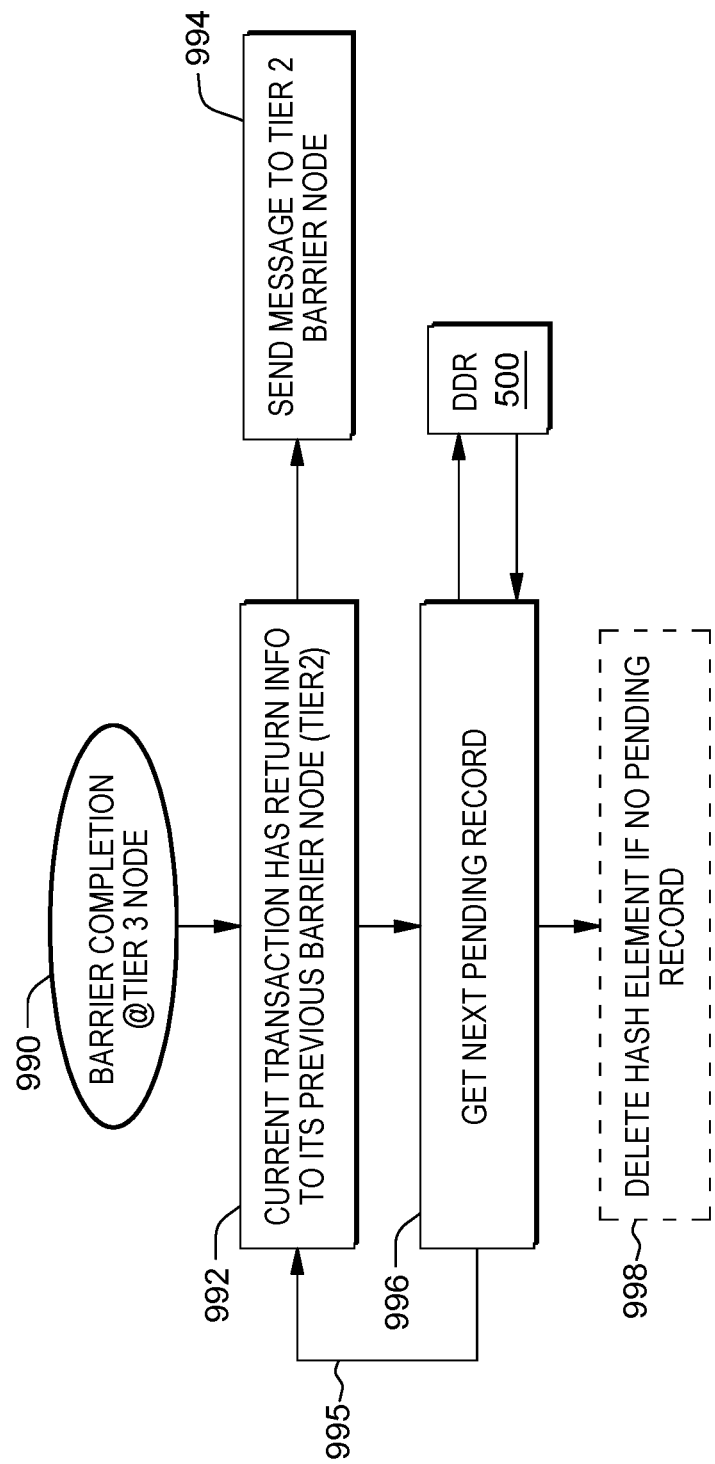

FIGS. 11A-11C illustrates a Master CNS process 950 that sets up barrier nodes (tier1,2,3) in the CNS system at operating system or application level software. These processes are called at each node in the tree in response to CS Barrier messages from their child nodes. CS Barrier messages are propagated up the multi-tier tree when barrier conditions are met at any node in the tree hierarchy (except for the top level node).

FIGS. 11A-11B particularly depict a further CSBarrier Multi-tier Flow process 950 where the Master CNS process sets up barrier nodes according to a barrier tree having 3 tiers, e.g., (tier1,2,3) in software. Prior to issuing barrier, it is decided how many processes are going to participate and it is assumed that the master process did the setup before hand.

As shown at 952, FIG. 11A, a user node (e.g., running process p0) of FIG. 8A) (via application level master process) issues a CSBarrier (barrier name) tuple command. In response, at 955, a determination is made by the work manager/scheduler at the CNS controller at that node whether the node is a barrier node. As the message CSBarrier is destined to a next tier level (e.g., level 1 node such as node t1_ph0 of FIG. 8C) a determination is made as to whether this node is a barrier node. If at 955, the work scheduler determines that the node is not a barrier node, then the CSBarrier message is sent to the messaging unit at 957 to send the issued CSBarrier (barrier name) message to the barrier node (e.g., node t1_ph0 in FIG. 8C). In response, at 959, messaging unit sends the CSBarrier (barrier name) message to the barrier node. Alternatively, the node receive and process a propagated CSBarrier message 953 from another node in the barrier, such as a child node, and propagated when all barrier conditions at that child node have been met, e.g., message sent to. In either scenario, at 955, if the work scheduler determines that the node is a barrier node, then at 960, the work manager forwards the message to a tuple engine of the controller. In response, the tuple engine performs applying a hash to and checking the hash of the barrier name and computing a hash entry address; and further, issues a read head pointer in the Hash table provided in near memory. Continuing to 963, the Tuple engine further determines from near memory 500 if the issued read head pointer points to a hash element, i.e., if a hash element exists. If a hash element does exist, the tuple engine computes a next address of the hash element and issues a Read Hash element.

Continuing to step 965, FIG. 11A, the default tuple engine operation of scanning the hash table for a key (tuple name) further includes the tuple engine scanning the hash table to find the barrier name. The TE does this by checking the near memory (DDR) response to see if hash element=barrier name. Thus, the tuple name in the hash element is compared to the barrier name key, and a determination is made as to whether the comparison results in the tuple name matching the requested barrier name. If at 965, it is determined that the tuple name does not match the barrier name requested, then the process at 964 returns to step 963 where the next hash element address is computed for the process to compare this associated tuple name against the barrier name. If and when a checked hash element in the linked list structure matches the barrier name, the process proceeds to 968, FIG. 11B.

At 968, FIG. 11B, the tuple engine, in response to the matched request, performs checking whether the barrier count=0 (meaning the last expected process has entered the barrier). If tuple engine determines that the barrier count does not equal 0, (meaning the last expected process has not yet reached the barrier), then the tuple engine decrements the hash element accumulator (count) by 1. The tuple engine obtains the head of pending record (linked) list of that hash element and issue a DDR memory read request for a first pending record. If at 968, it is determined that the barrier count=0 (meaning all processes have reached the barrier) and that the current tier is not the last tier (i.e., tier !=3), then at 985 the barrier setup message is propagated to the barrier to the next tier node for barrier setup (e.g., node t2_nh0 in FIG. 8C). For example, as shown in FIG. 8C, the nh_barrier (key, tier2, nh0) tuple message will be propagated by node t1_ph0 to the next tier node when all barrier conditions have been met at tier 1 level node t1_ph0. Otherwise, if at 968, it is determined that the barrier count=0 and that the current tier is the last tier (i.e., tier=3), then this means all processes all nodes have reached the barrier and the barrier completion process 990 at the last tier 3 node is performed as shown in FIG. 11C.

Otherwise, if at 968, if the Barrier count !=0, the process continues at 970 where the tuple engine obtains the next pointer of retrieved pending record, issues DDR read request 972 for the next pending record in linked list structure. Then, at 973, the tuple engine makes a determination whether the next pending record in the linked list is the last element of the list. If it is determined at 973 that the next pending record in the linked list is not the last element of the list, then the process at 974 returns to step 970 to repeat the steps of obtains the next pointer of retrieved pending record and issuing DDR read request for the next pending record in linked list structure. This iteration between 970, 973 and 974 repeats until the pointer to the last pending record in linked list structure is obtained. At such time, the process returns to step 975 where steps are implemented to obtain a new free pointer for the pending record, and writing a new pending record containing return information of the node that issued the barrier request. Once this pending record is created and written to near (e.g., DDR) memory at 977, and responsive to an acknowledgement message 979 received from the DDR memory, the process proceeds to step 980 where the tuple engine completes processing, notifies the work scheduler/user of the barrier completion, and notifies the natural home of the new record. The process proceeds to 982 where the Messaging unit at the CNS controller sends a message to the requester processes. It is understood that, in embodiments, the barrier count can be initialized as starting at zero (0) and for each time the tuple engine determines that the barrier count does not equal N (=number of barrier messages), (meaning the last expected process has not yet reached the barrier), then the tuple engine increments the hash element accumulator (count) by 1, such that when the barrier count reaches N, this indicates the barrier is completed.

In the processing of FIGS. 11A, 11B the accumulation of barrier pending records at each barrier tier node follows same steps until the last node tier reaches the barrier.

FIG. 11C depicts method steps to perform a barrier completion at the (last) tier 3 node responsive to the determination at step 968 that the barrier count=0. At step 992, FIG. 11C, there is obtained from the current transaction (i.e., a current record the tuple engine is currently processing (e.g., the PR just read from DDR)) return information to its previous barrier node (e.g., in tier2) and the Barrier completion message is sent to the tier 2 barrier node at 994. Continuing at 996, the tuple engine obtains the next pending record from DDR memory 500 and returns at 995 to perform the steps 992 and 994 for the next pending record. Steps 992, 994, 995, 996 are iterated until the last PR is processed.

The barrier completion process continues at each barrier node's return path. The barrier hash element will not be deleted as the Master barrier process takes care of deletion of barrier node hash elements.

In an alternate embodiment, the multi-node, multi-tier CNS barriers may be set up dynamically—without using the master process, such that all the information for setting up the barrier is included in the user messages to the participating nodes which will include the CNS barrier name information, information of the peer nodes participating, and who is a destination node to receive notification, etc.

In this embodiment, it is understood that the CSBarrier Multi-tier Flow depicted in FIGS. 11A-11C may be used to dynamically setup barrier nodes—without using the master process. In this embodiment, the same steps would be implemented other than at step 952, FIG. 11A where the initial user issues (at a requestor node) an expanded function call CSBarrier (barrier name, tier0, tier1, tier2, num_procs) tuple command. That is, all the parameters in the CSBarrier function call will be included. In this dynamic barrier setup, the tuple command specifies a particular tier and a number of processes to be collected at that tier for that barrier name. Remaining steps of FIGS. 11A-11C would be implemented. However, after the last PR is processed, the hash element can be deleted if no pending records remain as is indicated in FIG. 11C at 998.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Having thus described our invention, what we claim as new, and desire to secure by Letters Patent is:

1. A computer-implemented method for implementing a hierarchical tree barrier network for a plurality of processes running at multiple distributed computing nodes sharing a coordination namespace (CNS), said method comprising:

issuing a barrier on a tuple name associated with said plurality of processes, the barrier being scaled across multiple tier levels of computing nodes from a top tier level to a destination tier level of the hierarchical tree barrier network in said CNS, a number of local barrier computing nodes at a tier level being scaled down from a number of local computing nodes at its prior tier level, wherein said destination tier level being a single computing node;

creating, for association with each computing node participating in the hierarchical tree barrier network at a tier level, a corresponding hash element in an associated memory for tracking processes expecting to reach the barrier at one or more prior tier level computing nodes;

receiving a barrier tuple associated with each process participating in the barrier at the plurality of nodes indicating when the participating process has reached the barrier; and responsively generating a completion message and propagating said completion message up barrier nodes of the hierarchical tree network when barrier conditions at the local barrier computing nodes indicate all expected processes have reached the barrier.

2. The computer-implemented method of claim 1, further comprising, for a created hash element:

creating, using a controller, a linked list structure for collecting pending records, each pending record collected at top tier level local barrier computing nodes having return information associated with a respective process entering the barrier; and providing, at each said created hash element, a pointer for pointing to a head record of said linked list structure of collected pending records associated to keep track of the entered barrier processes.

3. The computer-implemented method of claim 2, wherein said issuing a barrier comprises:

mapping the plurality of processes to the top tier level of participating local barrier computing nodes of the hierarchical barrier tree network;

receiving, at each of the participating computing nodes at the top tier level, one or more barrier setup message requests indicating a barrier tuple name associated with the barrier network of said top tier level, each said barrier message request identifying a number of processes expected to reach the barrier at that receiving local barrier computing node of said top tier level;

each said participating local barrier computing nodes of said top tier level issuing respective barrier setup message requests indicating the associated barrier tuple name to a next lower tier level of local barrier computing nodes participating in said barrier network, said controller responsively creating the corresponding hash element including said linked list structure at each said next lower tier level barrier computing node; and repeating an issuing of respective barrier setup message requests from local computing nodes of a current next lower tier level for receipt at local computing nodes at a successive next lower tier level and the creating of the corresponding hash element at each successive next lower tier level barrier node, each request indicating the barrier tuple name associated with the barrier network, said repeating continuing until a successive next lower tier level barrier node is the destination level tier having a single local barrier computing node setup for said tuple name.

4. The method of claim 3, wherein said tracking comprises:

responsive to a received barrier tuple message, applying a hash function to said barrier tuple name to obtain a hash value, and using said hash value as an index into a hash table element, said hash table element comprising the pointer to a first element the linked list structure in the associated memory, said linked list structure storing pending records associated with nodes participating in the barrier.

5. The computer-implemented method of claim 4, further comprising:

tracking, using an accumulator, a count of a required number of pending records associated with the barrier tuple name expected to be added to the linked list structure at any local barrier node in the hierarchical tree.

6. The computer-implemented method of claim 5, further comprising:

for each process issuing a barrier for that tuple name, decrementing the count of said accumulator; and creating a corresponding pending record and adding said created pending record to the linked list structure.

7. The computer-implemented method of claim 6, wherein each pending record collected at a local barrier computing node of each successive next lower tier level comprises return location information of a requesting hash element associated with requesting local barrier computing nodes of its prior tier level, said notification message propagated up the hierarchical tree barrier network using the return location information of the requesting prior tier level hash elements stored in said pending record.

8. The computer-implemented method of claim 1, wherein the local barrier computing nodes at said top tier level send out the completion messages to completion queues formed in a system memory, each said plurality of processes monitoring the completion queues for obtaining notification that the barrier is complete.

9. A computer system for implementing a hierarchical tree barrier network for a plurality of processes running at multiple distributed computing nodes sharing a coordination namespace (CNS), said computer system comprising:

one or more processors at said one or more computing nodes running instructions stored in an associated memory for configuring the computer system to:

issue a barrier on a tuple name associated with said plurality of processes, the barrier being scaled across multiple tier levels of computing nodes from a top tier level to a destination tier level of the hierarchical tree barrier network in said CNS, a number of local barrier computing nodes at a tier level being scaled down from a number of local computing nodes at its prior tier level, wherein said destination tier level being a single computing node;

create, for association with each computing node participating in the hierarchical tree barrier network at a tier level, a corresponding hash element in an associated memory for tracking processes expecting to reach the barrier at one or more prior tier level computing nodes;

receive a barrier tuple associated with each process participating in the barrier at the plurality of nodes indicating when the participating process has reached the barrier; and responsively generate a completion message and propagate said completion message up barrier nodes of the hierarchical tree network when barrier conditions at the local barrier computing nodes indicate all expected processes have reached the barrier.

10. The computer system of claim 9, wherein said instructions stored in an associated memory further configuring the computer system to:

create, for a created hash element: a linked list structure for collecting pending records, each pending record collected at top tier level local barrier computing nodes having return information associated with a respective process entering the barrier; and provide, at each said created hash element, a pointer for pointing to a head record of said linked list structure of collected pending records associated to keep track of the entered barrier processes.

11. The computer system of claim 10, wherein to issue the barrier, said instructions stored in an associated memory further configuring the computer system to:

map the plurality of processes to the top tier level of participating local barrier computing nodes of the hierarchical barrier tree network;

receive, at each of the participating computing nodes at the top tier level, one or more barrier setup message requests indicating a barrier tuple name associated with the barrier network of said top tier level, each said barrier message request identifying a number of processes expected to reach the barrier at that receiving local barrier computing node of said top tier level;

each said participating local barrier computing nodes of said top tier level issuing respective barrier setup message requests indicating the associated barrier tuple name to a next lower tier level of local barrier computing nodes participating in said barrier network, said controller responsively creating the corresponding hash element including said linked list structure at each said next lower tier level barrier computing node; and repeat an issuing of respective barrier setup message requests from local computing nodes of a current next lower tier level for receipt at local computing nodes at a successive next lower tier level and the creating of the corresponding hash element at each successive next lower tier level barrier node, each request indicating the barrier tuple name associated with the barrier network, said repeating continuing until a successive next lower tier level barrier node is the destination level tier having a single local barrier computing node setup for said tuple name.

12. The computer system of claim 11, wherein to track processes at said hash element, said instructions stored in an associated memory further configuring the computer system to:

apply, in response to a received barrier tuple message, a hash function to said barrier tuple name to obtain a hash value, and using said hash value as an index into a hash table element, said hash table element comprising the pointer to a first element the linked list structure in the associated memory, said linked list structure storing pending records associated with nodes participating in the barrier.

13. The computer system of claim 12, wherein said instructions stored in an associated memory further configuring the computer system to:

track, using an accumulator, a count of a required number of pending records associated with the barrier tuple name expected to be added to the linked list structure at any local barrier node in the hierarchical tree.

14. The computer system of claim 13, wherein said instructions stored in an associated memory further configuring the computer system to:

for each process issuing a barrier for that tuple name, decrement the count of said accumulator; and create a corresponding pending record and add said created pending record to the linked list structure.

15. The computer system of claim 14, wherein each pending record collected at a local barrier computing node of each successive next lower tier level comprises return location information of a requesting hash element associated with requesting local barrier computing nodes of its prior tier level, said instructions stored in an associated memory further configuring the computer system to:

propagate said notification message up the hierarchical tree barrier network using the return location information of the requesting prior tier level hash elements stored in said pending record.

16. The computer system of claim 9, wherein the local barrier computing nodes at said top tier level send out the completion messages to completion queues formed in the associated memory, each said plurality of processes monitoring the completion queues for obtaining notification that the barrier is complete.

17. A computer program product, the computer program product comprising a computer-readable storage medium having a computer-readable program stored therein, wherein the computer-readable program, when executed on a computer system including at least one processor, causes the at least one processor to:

issue a barrier on a tuple name associated with said plurality of processes, the barrier being scaled across multiple tier levels of computing nodes from a top tier level to a destination tier level of the hierarchical tree barrier network in said CNS, a number of local barrier computing nodes at a tier level being scaled down from a number of local computing nodes at its prior tier level, wherein said destination tier level being a single computing node;

create, for association with each computing node participating in the hierarchical tree barrier network at a tier level, a corresponding hash element in an associated memory for tracking processes expecting to reach the barrier at one or more prior tier level computing nodes;

receive a barrier tuple associated with each process participating in the barrier at the plurality of nodes indicating when the participating process has reached the barrier; and responsively generate a completion message and propagate said completion message up barrier nodes of the hierarchical tree network when barrier conditions at the local barrier computing nodes indicate all expected processes have reached the barrier.

18. The computer program product of claim 17, wherein the computer-readable program further configuring the at least one processor to:

create, for a created hash element: a linked list structure for collecting pending records, each pending record collected at top tier level local barrier computing nodes having return information associated with a respective process entering the barrier; and provide, at each said created hash element, a pointer for pointing to a head record of said linked list structure of collected pending records associated to keep track of the entered barrier processes.

19. The computer program product of claim 18, wherein to issue the barrier, said computer-readable program further configuring the at least one processor to:

map the plurality of processes to the top tier level of participating local barrier computing nodes of the hierarchical barrier tree network;

receive, at each of the participating computing nodes at the top tier level, one or more barrier setup message requests indicating a barrier tuple name associated with the barrier network of said top tier level, each said barrier message request identifying a number of processes expected to reach the barrier at that receiving local barrier computing node of said top tier level;

issue, at each said participating local barrier computing nodes of said top tier level, respective barrier setup message requests indicating the associated barrier tuple name to a next lower tier level of local barrier computing nodes participating in said barrier network, said controller responsively creating the corresponding hash element including said linked list structure at each said next lower tier level barrier computing node; and repeat an issuing of respective barrier setup message requests from local computing nodes of a current next lower tier level for receipt at local computing nodes at a successive next lower tier level and the creating of the corresponding hash element at each successive next lower tier level barrier node, each request indicating the barrier tuple name associated with the barrier network, said repeating continuing until a successive next lower tier level barrier node is the destination level tier having a single local barrier computing node setup for said tuple name.

20. The computer program product of claim 19, wherein to track said processes, said computer-readable program further configuring the at least one processor to:

apply, responsive to a received barrier tuple message, a hash function to said barrier tuple name to obtain a hash value, and using said hash value as an index into a hash table element, said hash table element comprising the pointer to a first element the linked list structure in the associated memory, said linked list structure storing pending records associated with nodes participating in the barrier.

* * * * *